United States Patent
Audette et al.

(10) Patent No.: US 9,192,264 B2
(45) Date of Patent: Nov. 24, 2015

(54) FOOD PROCESSOR

(75) Inventors: David M. Audette, Webster, MA (US);
Alexander J. Calvino, Cranston, RI (US); Waiman Chung, Kowloon (HK);
Aric Jennings, Boston, MA (US);
Daniel Stephen Potter, Woburn, MA (US); Andrea Stavrinou, Brighton, MA (US)

(73) Assignee: Euro-Pro Operating LLC, Newton, MA (US)

( * ) Notice: Subject to any disclaimer, the term of this patent is extended or adjusted under 35 U.S.C. 154(b) by 786 days.

(21) Appl. No.: 13/031,684

(22) Filed: Feb. 22, 2011

(65) Prior Publication Data

US 2012/0024993 A1    Feb. 2, 2012

Related U.S. Application Data

(60) Provisional application No. 61/367,973, filed on Jul. 27, 2010.

(51) Int. Cl.
*A47J 43/046* (2006.01)
*A47J 43/07* (2006.01)

(52) U.S. Cl.
CPC ............ *A47J 43/0766* (2013.01); *A47J 43/046* (2013.01); *A47J 43/0777* (2013.01)

(58) Field of Classification Search
USPC ........................ 241/282.1, 282.2, 36, 37.5, 30
See application file for complete search history.

(56) References Cited

U.S. PATENT DOCUMENTS

| | | |
|---|---|---|
| 3,786,999 A | 1/1974 | Cabell |
| 3,892,365 A | 7/1975 | Verdun |
| 4,174,073 A | 11/1979 | Maher et al. |
| 4,335,860 A | 6/1982 | Grandel et al. |
| 4,373,677 A | 2/1983 | Kunihiro |
| 4,396,159 A | 8/1983 | Podell |
| 4,487,509 A | 12/1984 | Boyce |
| 4,506,836 A | 3/1985 | Williams |
| 4,629,131 A | 12/1986 | Podell |

(Continued)

FOREIGN PATENT DOCUMENTS

| | | |
|---|---|---|
| CN | 201160797 Y | 12/2008 |
| DE | 1529275 | 7/1969 |

(Continued)

OTHER PUBLICATIONS

International Search Report and Written Opinion for PCT/US2011/044605 mailed Mar. 20, 2012.

(Continued)

*Primary Examiner* — Mark Rosenbaum
(74) *Attorney, Agent, or Firm* — Wolf, Greenfield & Sacks, P.C.

(57) ABSTRACT

A food processor is provided which includes a container, a blade assembly, and a base arranged such that the container is coupleable to the base. The base includes a housing and a motor configured to drive the blade assembly. The food processor further includes an actuator included with the container moveable between a first position and a second, extended position. When the container is coupled to the base and the actuator is in the second, extended position, the actuator is configured to actuate a switch to permit activation of the motor, and the base is constructed such that the container can be coupled to the base when the actuator is in the second, extended position.

24 Claims, 24 Drawing Sheets

(56) References Cited

U.S. PATENT DOCUMENTS

| | | | |
|---|---|---|---|
| 4,716,823 A | 1/1988 | Capdevila | |
| 6,568,843 B1 | 5/2003 | Lai | |
| 6,637,681 B1 | 10/2003 | Planca | |
| 6,910,800 B2 | 6/2005 | Wu | |
| 7,419,111 B2 | 9/2008 | Gursel | |
| 7,520,453 B2 | 4/2009 | Clapp et al. | |
| 7,677,485 B2 | 3/2010 | Gursel | |
| 8,376,253 B2 | 2/2013 | Oblak et al. | |
| 8,382,018 B2 | 2/2013 | Oblak et al. | |
| 8,702,300 B2 | 4/2014 | Audette | |
| 2004/0046075 A1 | 3/2004 | Gursel | |
| 2009/0045272 A1 | 2/2009 | Lin | |
| 2011/0248108 A1 | 10/2011 | Carriere | |
| 2012/0027902 A1 | 2/2012 | Audette et al. | |
| 2014/0217216 A1 | 8/2014 | Audette | |

FOREIGN PATENT DOCUMENTS

| | | | |
|---|---|---|---|
| EP | 0025972 A1 | 4/1981 | |
| EP | 0699409 A1 | 3/1996 | |
| JP | 06-036538 U | 5/1994 | |
| KR | 10-2004-0028866 A | 4/2004 | |
| KR | 10-2007-0067171 A | 6/2007 | |
| NL | 110380 | 12/1964 | |
| TR | 02/02145 U | 12/2002 | |
| WO | WO 2008/031708 A2 | 3/2008 | |
| WO | WO 2009/021842 A2 | 2/2009 | |
| WO | WO 2009/021842 A3 | 4/2009 | |

OTHER PUBLICATIONS

Office Action for Cn 201180041740.4 mailed Jul. 31, 2014 (E0465.70136CN02). [Note — no. copies of U.S. patents, published U.S. patent applications, or pending, unpublished patent applications stored in the Uspto's Image File Wrapper (Ifw) system, are included. See 37 Cfr § 1.98 and 12870G163. Copies of all other patent(s), publication(s), unpublished, pending U.S. patent applications, or other information listed are provided as required by 37 Cfr § 1.98 unless 1) such copies were provided in an Ids in an earlier application that complies with 37 Cfr § 1.98, and 2) the earlier application relied upon for an earlier filed under 35 U.S.C. § 120.] All References Considered Except it Here Lined Through. /M.R.1.

FOOD PROCESSOR

RELATED APPLICATIONS

This application claims the benefit under 35 U.S.C. §119 (e) of U.S. Provisional Application Ser. No. 61/367,973 entitled "BLENDER," filed on Jul. 27, 2010, which is herein incorporated by reference in its entirety.

FIELD OF INVENTION

The present invention is directed to a food processor, and more particularly to a food processor having one or more unique features designed for enhancing the safety, ease of use, and/or the versatility of the food processor.

BACKGROUND OF INVENTION

There are a variety of types of food processors on the market designed to mix, cut, blend, or otherwise process food.

One type of conventional food processor is commonly referred to as a blender. A conventional blender includes a container, a lid, and a rotary blade positioned at the bottom of the container. The blender also includes a base which houses a motor. When the container is placed on the base, the motor is configured to drive the rotary blade to mix, cut or blend food within the container.

SUMMARY OF INVENTION

In one illustrative embodiment, a food processor is provided which includes a container sized for receiving food to be processed, a blade assembly, and a base constructed and arranged such that the container is coupleable to the base. The base includes a housing, and a motor within the housing, the motor configured to drive the blade assembly. The food processor further includes an actuator included with the container, the actuator being moveable between a first position and a second, extended position, where when the container is coupled to the base and the actuator is in the second, extended position, the actuator is configured to actuate a switch to permit activation of the motor, and where the base is constructed and arranged such that the container can be coupled to the base when the actuator is in the second, extended position.

In another illustrative embodiment, a food processor base is provided which includes a housing configured to be coupled to a food processor container, where the housing is constructed and arranged such that the food processor container is coupleable to the housing, a motor within the housing, the motor configured to drive a blade assembly within the food processor container, and a switch within the housing, the switch constructed and arranged to permit activation of the motor. The housing includes at least one receptacle having a pathway configured to receive a switch actuator, where the receptacle includes an open side portion such that the food processor container can be coupled to the base.

In yet another illustrative embodiment, a method of processing foods is provided. The method includes the act of providing a food processor having a container, a blade assembly, a lid, a base with a motor configured to drive the blade assembly, and an actuator included with the container that is moveable between a first position and a second, extended position, wherein when the food processor container is coupled to the base and the actuator is in the second, extended position, the actuator is configured to actuate a switch to permit activation of the motor. The method further includes the acts of coupling the lid to a top of the container, moving the container actuator into the second, extended position, and coupling the container to the base, where the base is constructed and arranged such that the container can be coupled to the base when the actuator is in the second, extended position.

Various embodiments of the present invention provide certain advantages. Not all embodiments of the invention share the same advantages and those that do may not share them under all circumstances.

Further features and advantages of the present invention, as well as the structure of various embodiments that incorporate aspects of the invention are described in detail below with reference to the accompanying drawings.

BRIEF DESCRIPTION OF DRAWINGS

The foregoing and other objects and advantages of the invention will be appreciated more fully from the following drawings, wherein like reference characters designate like features, in which.

DETAILED DESCRIPTION

Figure 1:
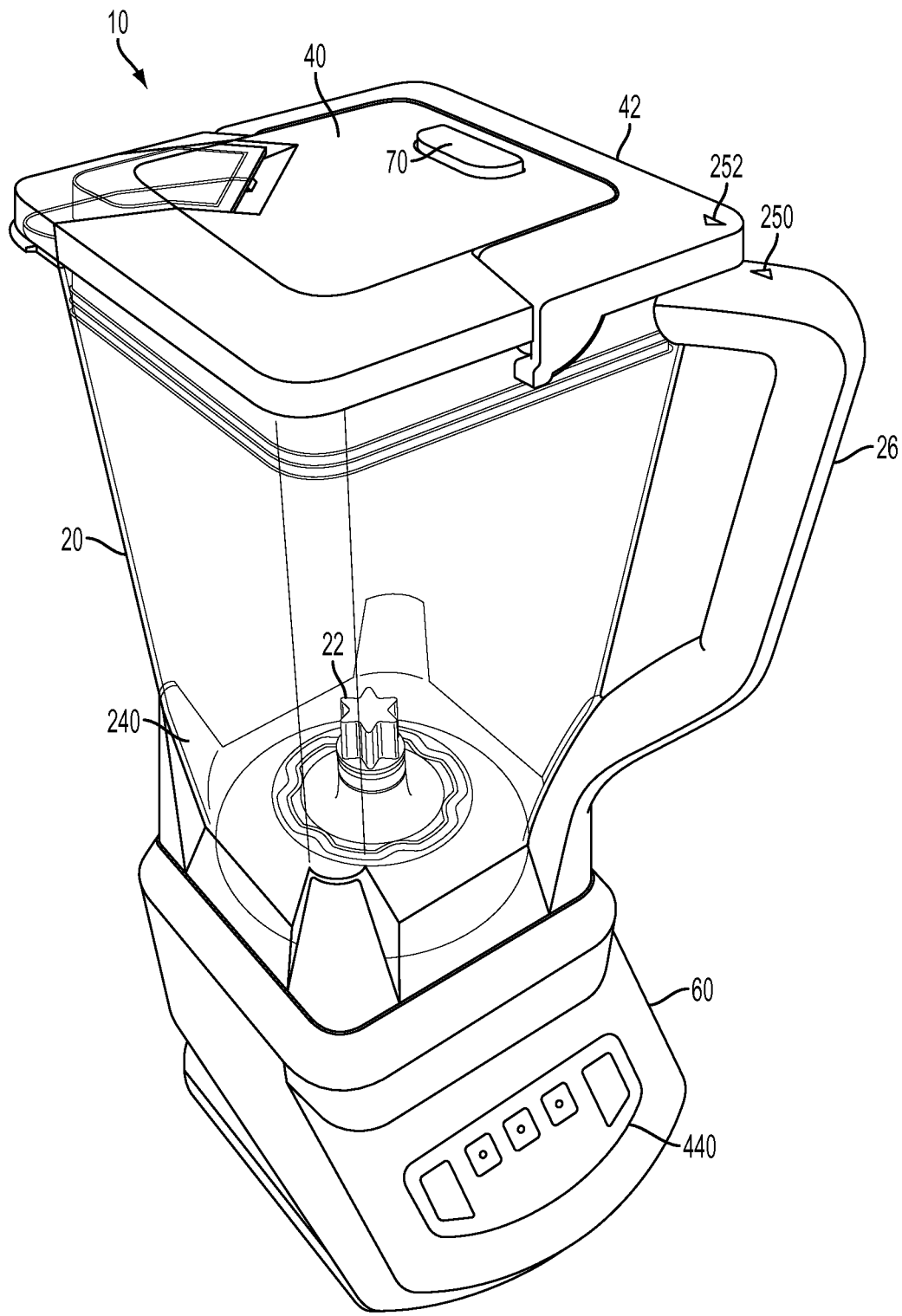
FIG. 1 is perspective view of a food processor according to one embodiment.

Applicant recognized that there are some drawbacks associated with the above-mentioned conventional food processors. For example, in one type of conventional food processor, the motor is configured to drive the blade when the container is placed on the base. Applicant recognized that, in some circumstances, this configuration may allow the blade to be driven before the lid is secured to the container. This may cause injury if a user's hand is in the container and/or may cause the contents to spill from the container. Thus, aspects of the present invention are directed to a food processor with an actuator configured to prevent activation of the motor unless the lid is secured to the container.

Additionally, in one type of conventional food processor, a user press fits the lid to the top of the container to secure the lid. Applicant recognized that, in some circumstances, the lid may not be securely fixed to the container and/or it may be difficult to determine whether the lid is securely fixed to the container. Thus, aspects of the present invention are directed to a food processor with a lid that locks to the container.

Aspects of the present invention are also directed to a food processor with a lid that is configured such that a user may easily determine whether the lid is locked to the container. As discussed below, the lid may include a handle whose position permits a user to readily determine whether the lid is locked to the container. The position of the handle may also enable a user to ascertain whether an actuator is configured to permit actuation of the motor.

Further, in one type of conventional food processor, to mount the container to the base, the container is simply placed on top of the base. Applicant recognized that, in some circumstances, a more secure connection between the container and the base may be desired. Accordingly, aspects of the present invention are directed to a food processor including a container that can be locked to the base. Additionally, aspects of the present invention are directed to a food processor including a container that is slidably couplable to the base, and other aspects of the invention are directed to a food processor having a container that is rotatably couplable to the base.

It should be appreciated that for purposes herein, the term "food processor" refers to any device that is designed to mix, cut, blend, whip or otherwise process food. As discussed above, one type of food processor is commonly referred to as a blender. "Blender" is a term that is typically used to reference a device that is designed for blending liquids. Although the present invention includes blenders, it should not be limited in this respect. In one embodiment, the food processor is designed for processing liquids. In another embodiment, the food processor is designed for processing solid foods. In yet another embodiment, the food processor is designed for processing both liquid and solid foods.

Turning to FIGS. 1-5, one embodiment of a food processor 10 according to the present invention is illustrated. In this embodiment, the food processor 10 includes a container 20, a lid 40, and a base 60. The container 20 is sized to receive food, and is configured to receive a blade assembly (exemplary blade assemblies are discussed in greater detail further below and are shown in FIGS. 18-22). As discussed below, in one embodiment, the container 20 has a spindle 22 configured to receive a blade assembly. As shown, the container 20 may have a handle 26 for easily grasping the container. The base includes a motor 156 (see FIG. 23), which when activated, drives the spindle and, ultimately, the blade assembly to process food within the container. Various embodiments of the blade assembly are discussed further below, but it should be appreciated that the blade assembly may be configured to mix, cut, puree, slice, dice, blend, whip or otherwise process food within the container, as the invention is not necessarily limited in this respect.

As discussed above, in one type of conventional food processor, the lid is simply press fit to the top of the container. In contrast, in the embodiment shown in FIGS. 1-5, the lid 40 is configured to lock to the container 20. In this particular embodiment, the lid includes a handle 42 which is attached to the lid 40 and movable between a first position shown in FIG. 2, and a second position shown in FIGS. 1 and 4. When the handle 42 is in the first position, the lid 40 is capable of being coupled to the container by moving the lid downwardly onto the container. When the lid 40 is coupled to and aligned with the top of the container 20, the handle 42 may be moved to the second position, locking the lid 40 to the container 20.

As shown in FIGS. 2-5, the handle 42 includes a handle engagement element 44 and the container 20 includes a container engagement element 24 which is engageable with the handle engagement element 44. Movement of the handle 42 from the first position (see FIG. 2) into the second position (see FIGS. 3 and 4) engages the handle engagement element 44 with the container engagement element 24 to lock the lid 40 to the container 20. When locked, the lid 40 cannot be removed unless the handle 42 is moved out of the second position.

In this particular illustrative embodiment, the container engagement element 24 includes a curved protrusion or rib on the upper part of the container, and the handle engagement element 44 includes a curved channel on the handle 42. Rotation of the handle 42 from the first position to the second position rotates the channel into engagement with the rib such that the lid 40 is locked to the container 20. Movement of the handle 42 from the second position back to the first position disengages the channel from the rib to unlock the lid 40 from the container 20.

Although a rib and channel configuration is discussed above, it should be appreciated that the handle engagement element 44 and the container engagement element 24 may be configured differently as the present invention is not necessarily limited in this respect. For example, it is also contemplated that a protrusion or rib may be provided on the handle 42 and a mating channel may be provided on the container 20. Further, other engagement elements known to one of skill in the art such as, but not limited to latches, hooks, pins, etc. are also contemplated as the present invention is not so limited.

In the embodiment illustrated in FIGS. 1-5, the handle engagement element 44 includes more than one engaging portion, and may include, for example, a first engagement portion and a second engagement portion. This particular embodiment includes a first channel positioned on one side of the lid 40 and a second channel spaced apart from the first channel and positioned on an opposite side of the lid 40. Similarly, the container engagement element 24 includes a first portion and a second portion where the second portion is positioned on a side of the container opposite the first portion. In this particular embodiment, the container engagement element 24 includes a first rib positioned on one side of the container and a second rib spaced apart from the first rib and positioned on an opposite side of the container 20.

The lid handle 42 may be configured in a variety of ways, as the invention is not so limited. As illustrated, in one embodiment, the handle 42 is rotatable between the first position and the second position. In the illustrated embodiment, the first and second positions of the handle 42 are spaced apart by approximately 90°. In another embodiment, the first and second positions may be spaced apart by less than 90°, such as, but not limited to, approximately 45° or approximately 60°. In another embodiment, the first and second positions may be spaced apart by more than 90°, such as approximately 180°, or approximately 270°. It is also contemplated that the handle may move between the first and second positions with linear movement instead of, or in addition to, rotational movement.

In one illustrative embodiment, the handle 42 is substantially U-shaped and the lid 40 includes a recessed portion 38 which is shaped to receive the U-shaped handle 42 such that the handle 42 is adapted to fit within at least a portion of the recessed portion 38 of the lid when the handle is in the second position. As illustrated, in one embodiment, the handle 42 is substantially flush with the lid body 46 when the handle 42 is in the second position. Other handle shapes and configurations are also contemplated as the invention is not so limited.

Figure 7:
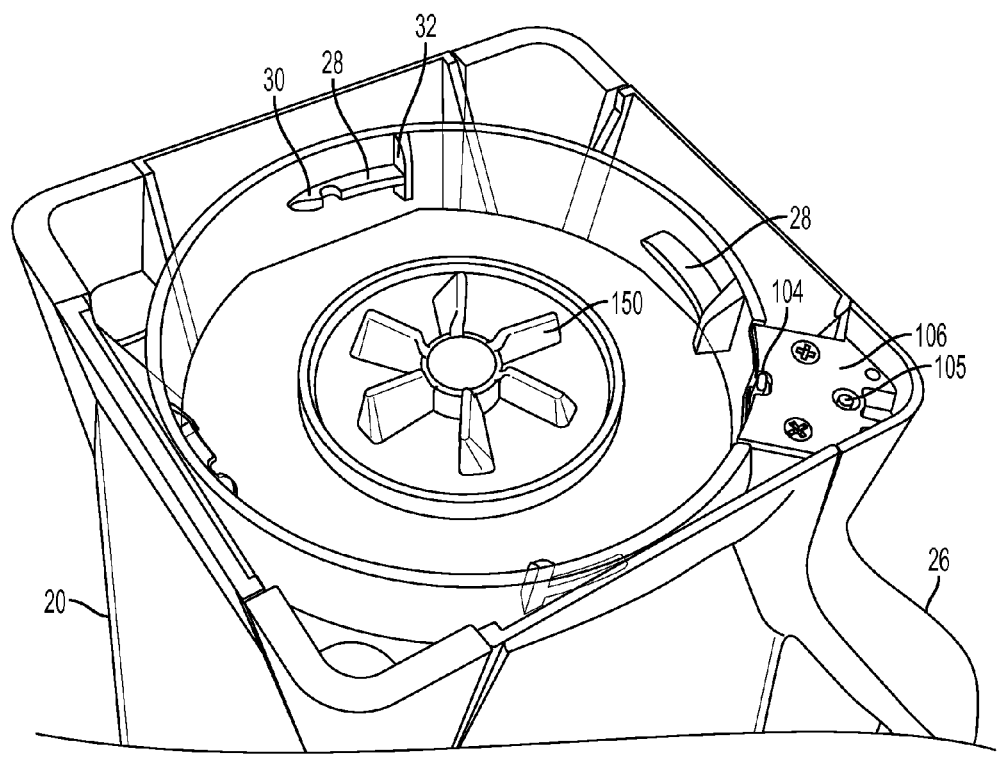
FIG. 7 is a bottom partial perspective view of the container according to one embodiment.
Figure 8:
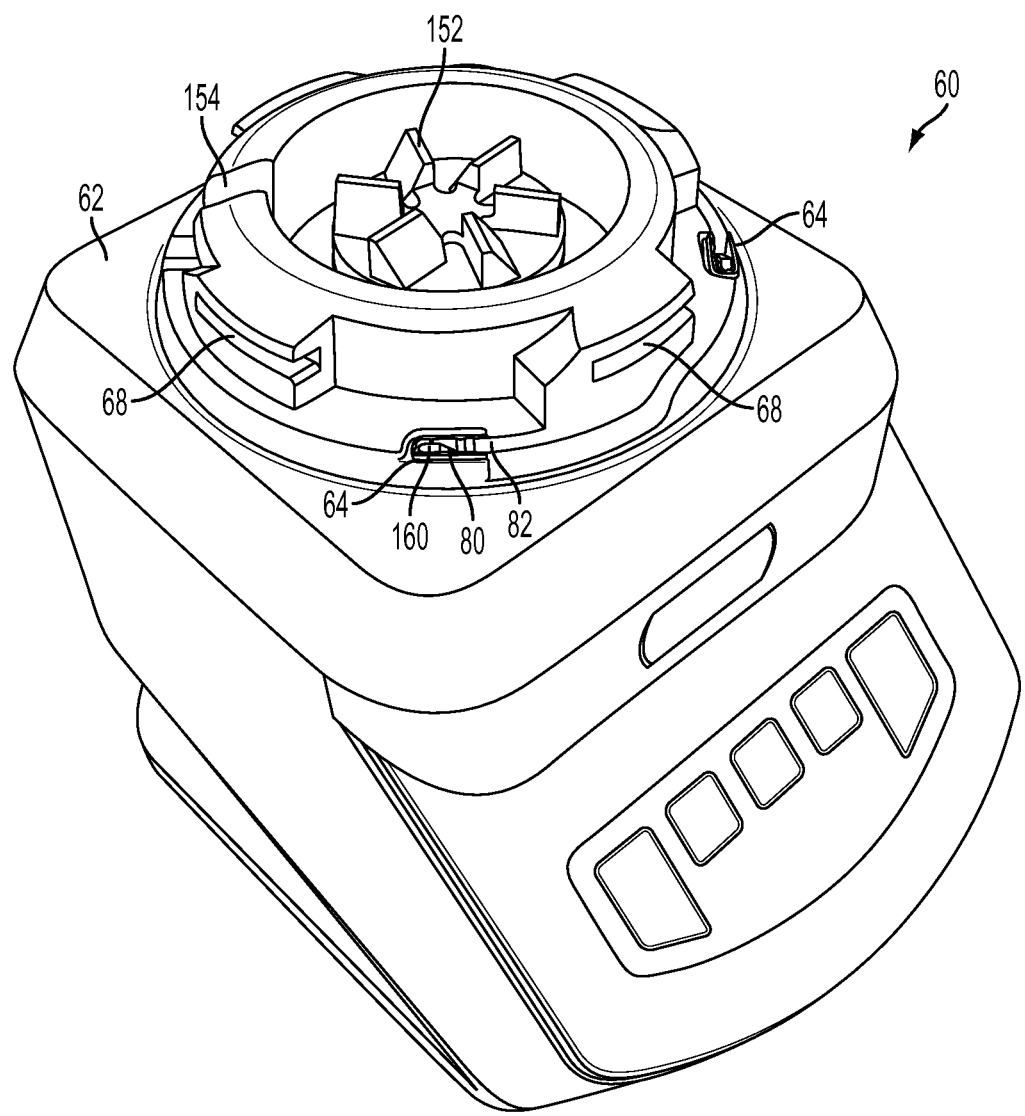
FIG. 8 is a perspective view of a base according to one embodiment.

As shown in FIGS. 7 and 8, the bottom of the container 20 includes a container clutch 150 and the top of the base 60 includes a motor clutch 152. When the container 20 is coupled to the base, the clutches 150, 152 engage such that activation of the motor 156 (see FIG. 23) housed within the base 60 causes rotation of the spindle 22, and in turn, rotation of a blade assembly coupled to the spindle 22.

As discussed below, aspects of the present invention are directed to a food processor with an actuator which may be configured to activate a switch 158 (see FIG. 23) to permit activation of the motor, and thus permit activation of the clutches 150, 152, once the lid is secured to the container.

Figure 6:
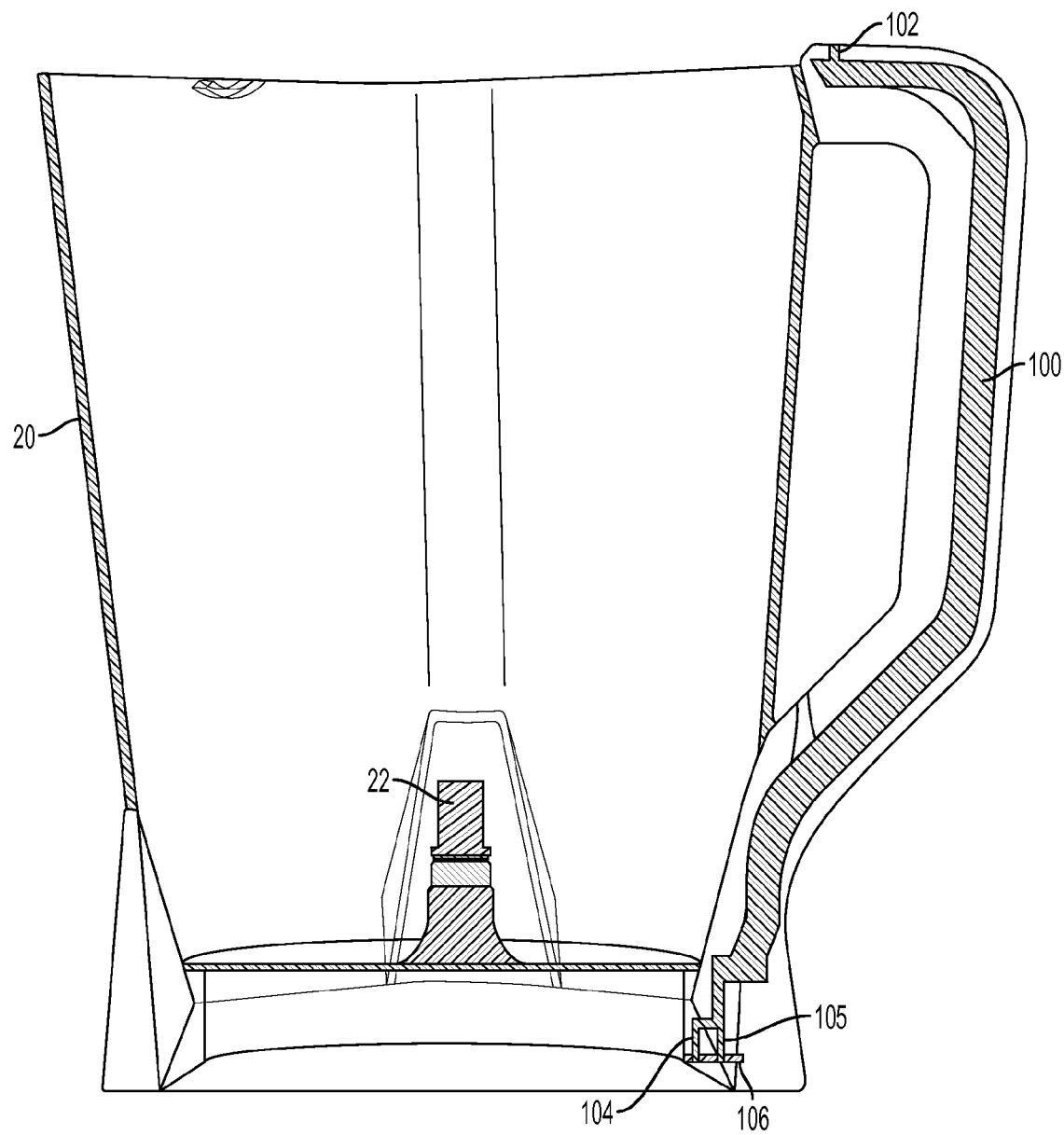
FIG. 6 is a cross-sectional view of the container according to one embodiment.
Figure 9:
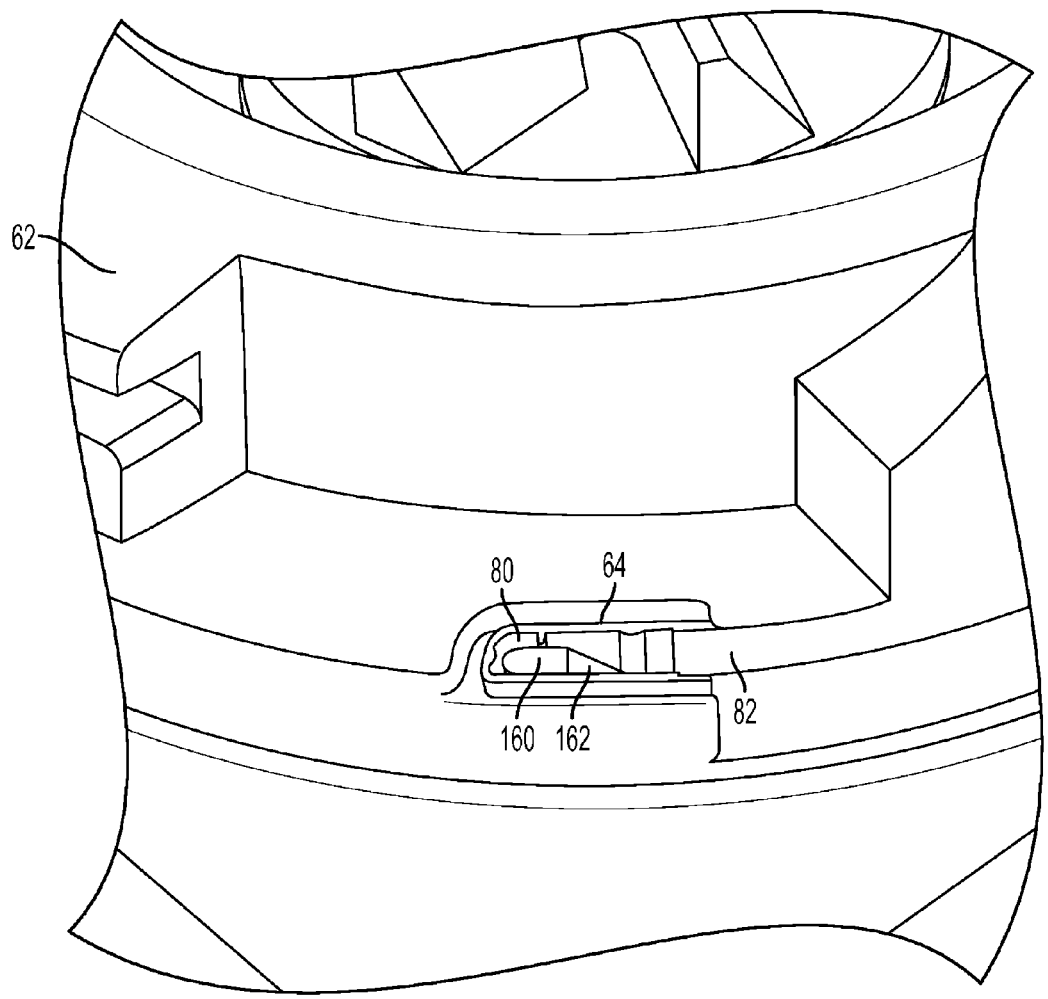
FIG. 9 is a detailed perspective view of a portion of the base shown in FIG. 8.
Figure 10:
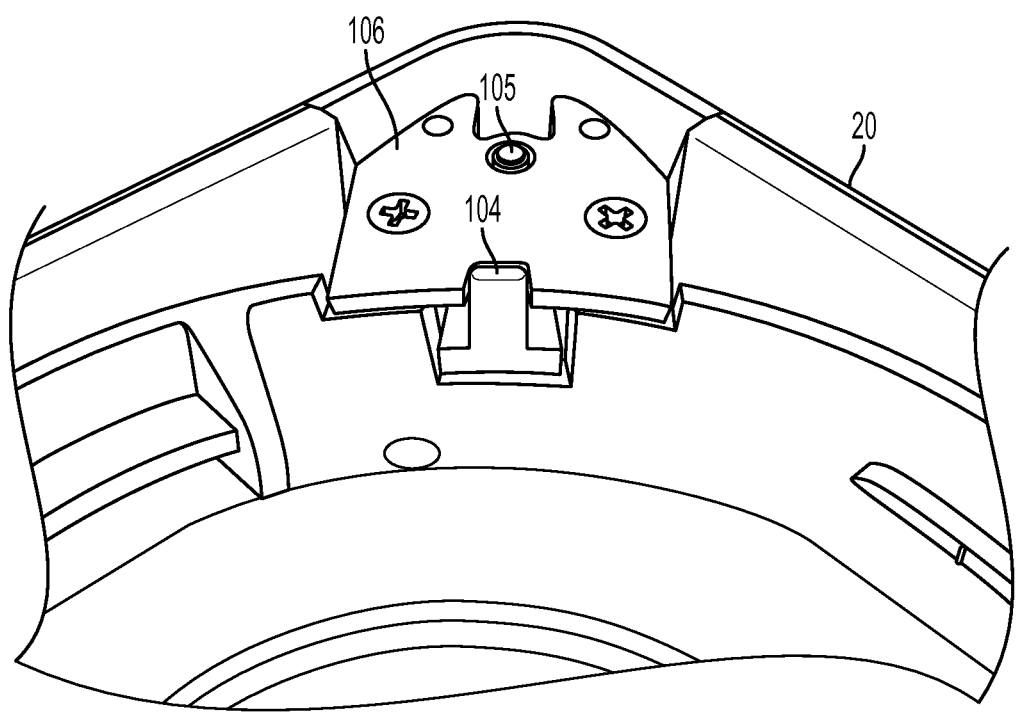
FIG. 10 is a detailed perspective view of the bottom of the container according to one embodiment with an actuator shown in a first position.
Figure 11:
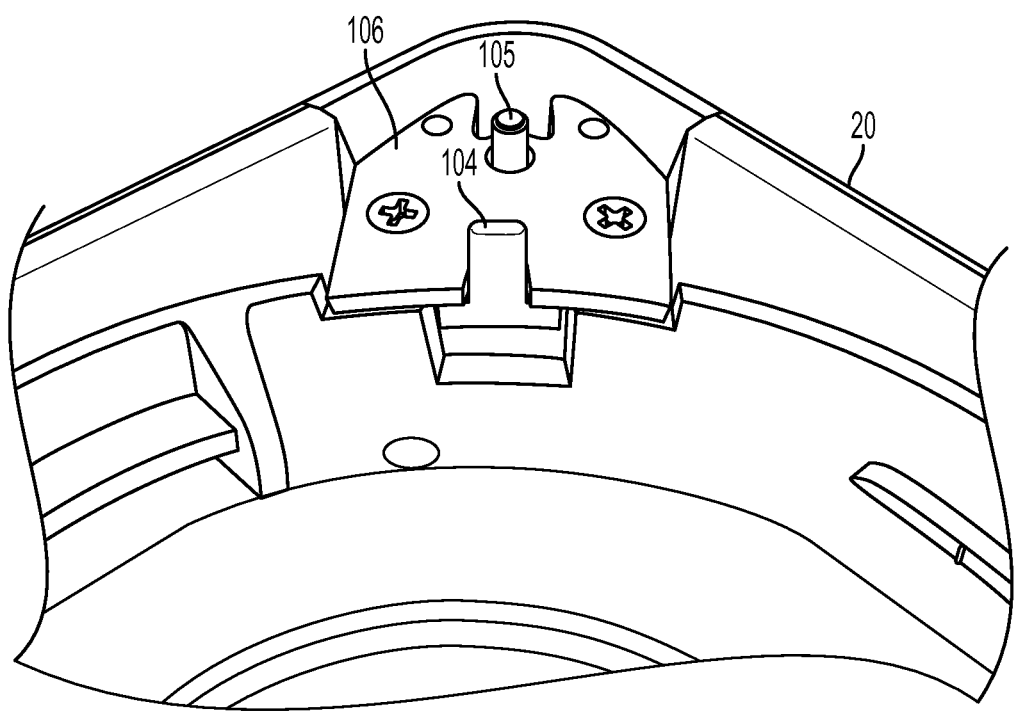
FIG. 11 is a detailed perspective view of the bottom of the container according to one embodiment with an actuator shown in a second, extended position.

FIGS. 6-11 illustrate one embodiment of an actuator. In particular, as shown in FIG. 6, the container 20 includes an actuator 100, which, in this embodiment, is positioned within the handle 26 of the container 20. The container actuator 100 has a first end 102 positioned at the top of the handle 26 and a second end 104 positioned at the bottom of the container 20. When the container 20 is coupled to the base 60, the second end 104 of the actuator 100 is configured to actuate a switch 158 (see FIG. 23) to permit activation of the motor 156. In one embodiment, the container actuator 100 is moveable between a first position (see FIGS. 6, 7 and 10) and a second, extended position (see FIG. 11). The end 104 of the actuator may be configured to actuate a switch 158 that may be housed within the base 60. For example, as discussed further below, and as illustrated in FIGS. 8-9, in one embodiment, the base 60 has a housing 62 which encloses the motor 156. The housing 62 may include a receptacle 64 having a pathway configured to receive the end 104 of the container actuator 100 to activate a switch 158 within the housing 62.

It should be appreciated that although in one embodiment, the actuator 100 is positioned within the handle 26 of the container 20, the invention is not necessarily so limited. In another embodiment, the actuator 100 may be positioned to extend along one of the walls of the container 20, and may for example extend within one of the corners of the container. Furthermore, it is contemplated that the actuator 100 may extend either inside or outside of the container 20.

In one illustrative embodiment, the actuator 100 is configured to move in a substantially linear direction between the first position and a second position. It should also be recognized that the actuator 100 may be configured to move differently, and may for example incorporate rotational movement between the first position and the second position as the invention is not limited in this respect.

Figure 2:
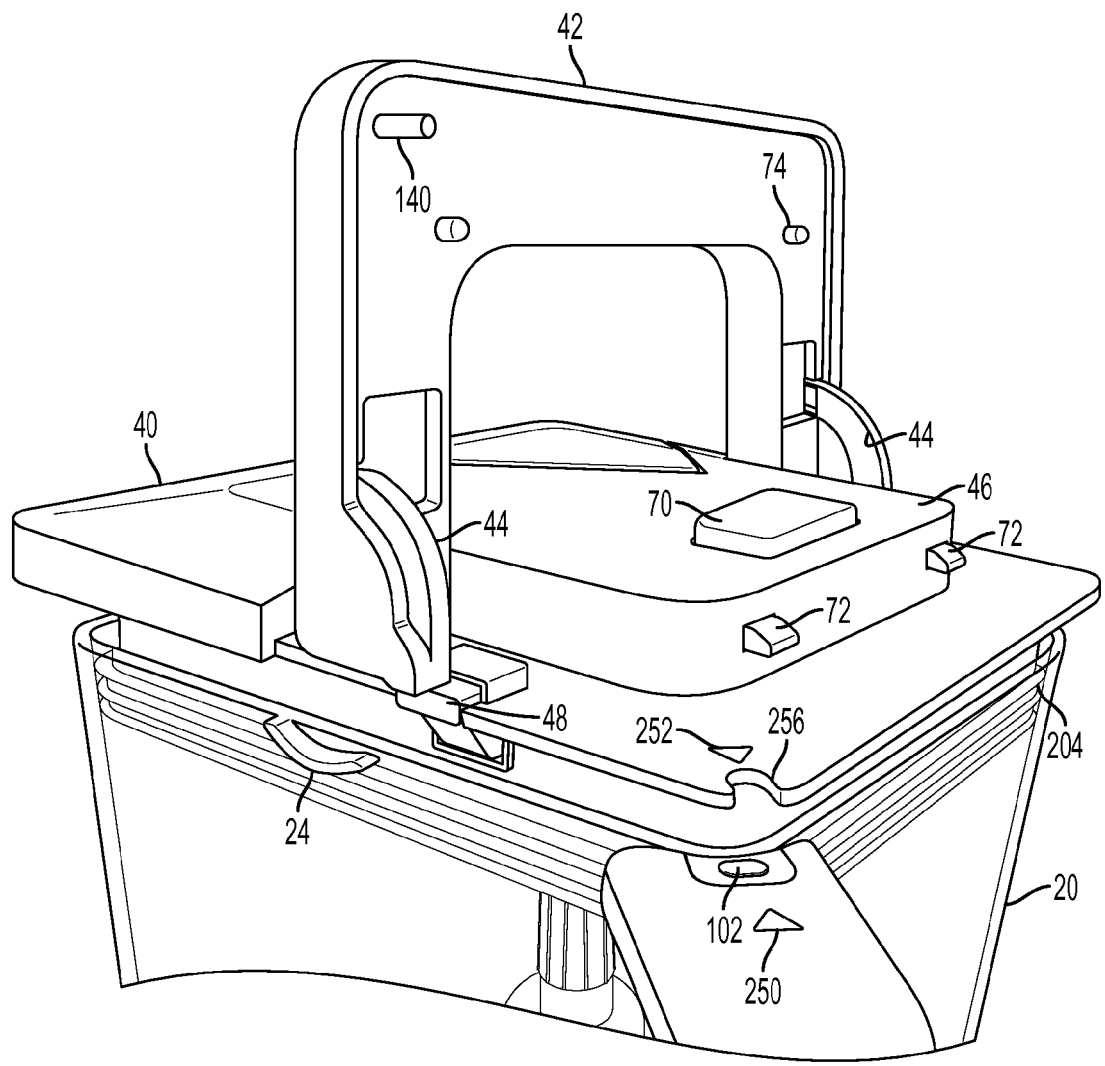
FIG. 2 is a partial perspective view of a food processor according to one embodiment with a handle shown in a first position.
Figure 3:
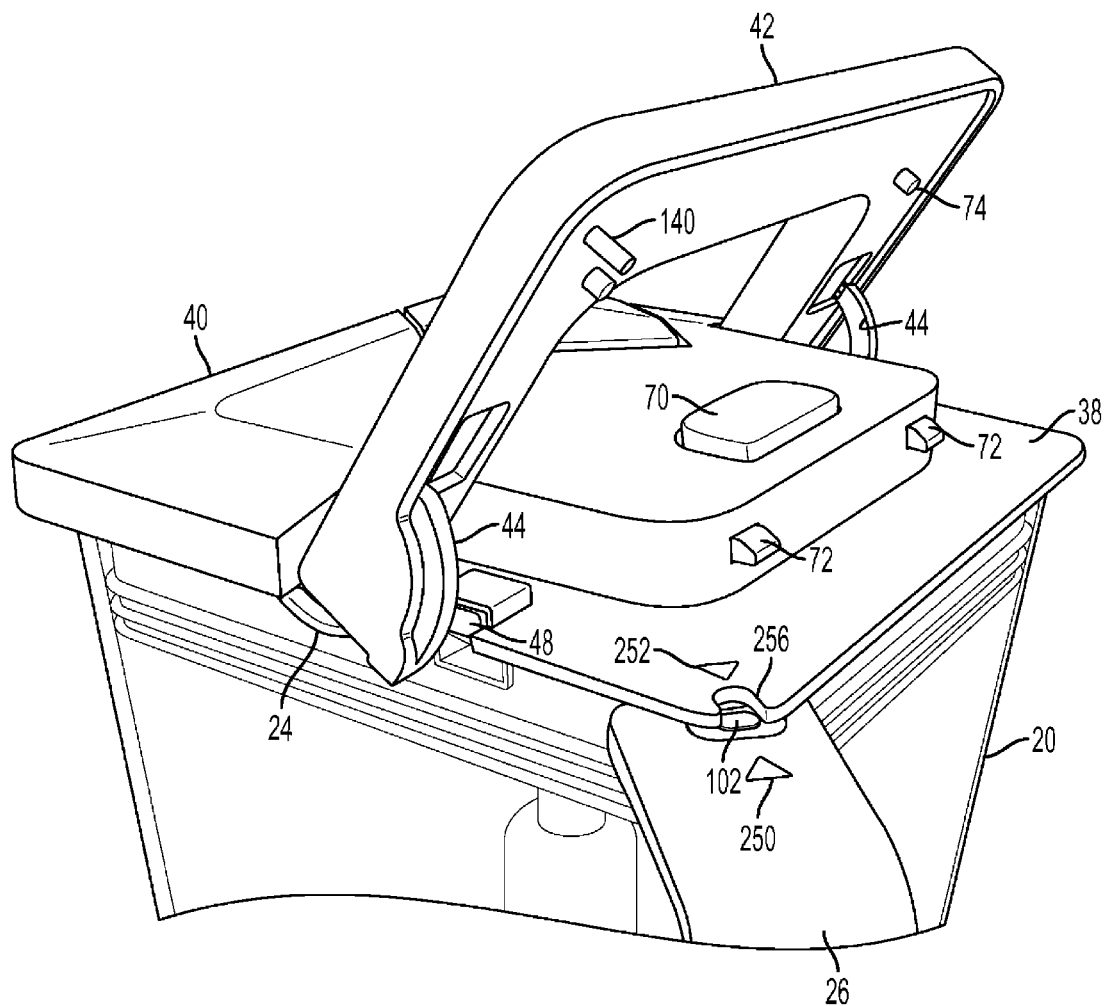
FIG. 3 is a partial perspective view of the food processor shown in FIG. 2 with the handle shown moving toward a second position.
Figure 4:
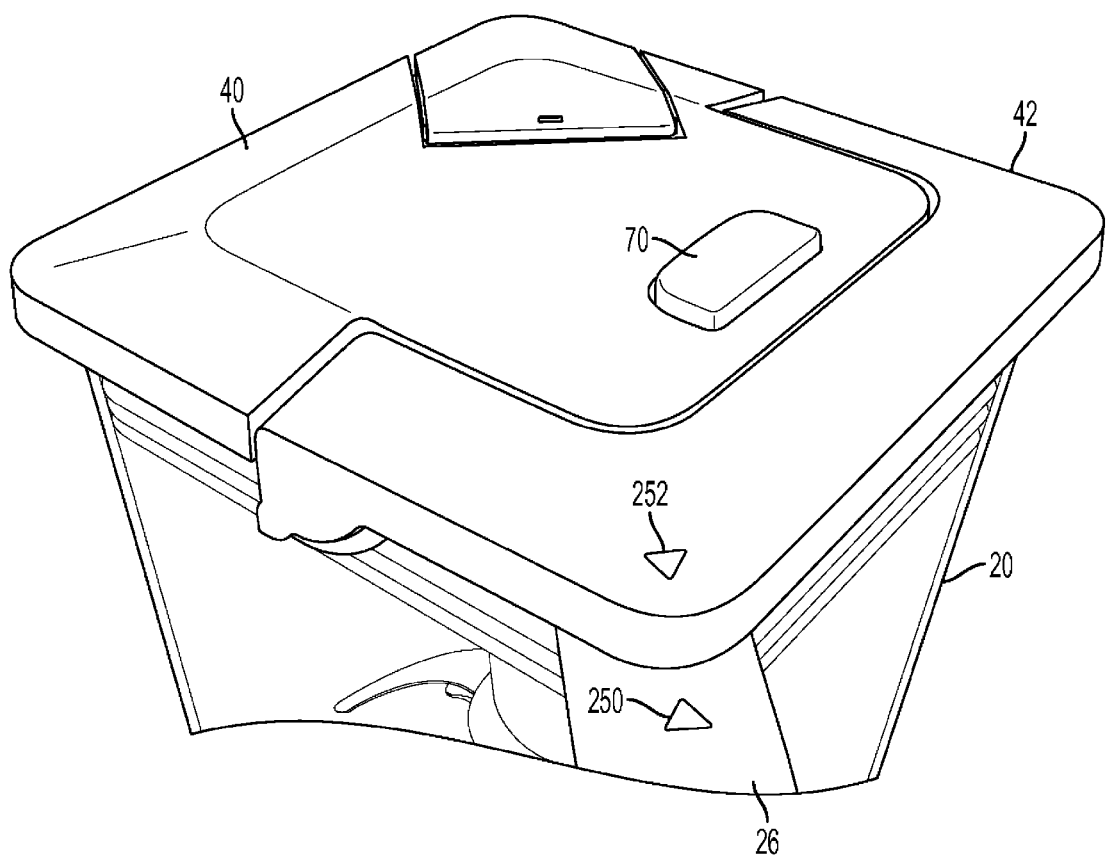
FIG. 4 is a partial perspective view of the food processor shown in FIGS. 2-3 with the handle shown in the second position.

Turning back to FIGS. 2-4, the lid 40 may have a lid actuator 140 configured such that when the lid 40 is coupled to the container 20, the lid actuator 140 is moveable into contact with the first end 102 of the container actuator 100 to permit activation of the motor. In one illustrative embodiment, the lid actuator 140 is positioned on the handle 42 such that movement of the handle from the first position to the second position moves the lid actuator 140 into contact with the first end 102 of the container actuator 100. As shown in FIGS. 2-3, the lid 40 may include a notch 256 positioned to accommodate the lid actuator 140 when the lid handle 42 is in the second position. In one embodiment, when the handle is in the first position, the motor is prevented from being activated, and when the handle is in the second position, activation of the motor is permitted. The lid actuator and handle may be configured such that the motor is prevented from being activated when the handle is moved out of the second position.

As shown in FIGS. 8 and 9, the base 60 may have a base actuator 160 which is configured to permit activation of the motor upon contact with the container actuator 100. In one embodiment, the base actuator 160 is positioned within the receptacle 64 and the second end 104 of the container actuator 100 is configured to contact the base actuator 160 when in the second, extended position to permit activation of the motor. The base actuator 160 may be arranged to activate the switch 158 (see FIG. 23) to activate the motor 156.

It should be appreciated that any of the above-mentioned actuators may be biased by a spring or otherwise. For example, in one embodiment, the container actuator 100 is spring biased in the first position in which the second end 104 of the actuator may be retracted into the container 20. In another embodiment, the base actuator 160 may be spring biased in a direction towards the container 20 (and away from the switch 158). In one embodiment, the lid actuator 140 may be spring biased. However, in the illustrative embodiment of FIG. 2, the lid actuator 140 is rigidly attached to the underside of the handle 42 and is configured to rotate therewith. It should be appreciated that one of skill in the art would recognize that there are a variety of ways in which the actuators may be biased, and the invention is not so limited.

As shown in FIGS. 6, 7, 10 and 11, the second end 104 of the container actuator 100 may include a guide arm 105 which may assist in the movement of the second end 104 of the actuator 100 by maintaining the alignment of the actuator 100 during the substantially linear movement of the actuator into and out of the receptacle 64 in the base 60. In one embodiment, the underside of the container 20 includes a plate 106 with an opening through which the second end 104 of the actuator and/or the guide arm 105 may selectively extend. The plate 106 may help to shield the actuator 100 to prevent unwanted materials from interfering with the movement of the actuator 100.

The food processor may be configured such that when the lid handle 42 is in the first position (see FIG. 2), the lid 40 is capable of being coupled to the container 20. In one embodiment, the handle 42 is prevented from moving into the second position until the lid 40 is coupled to the container 20. This may prevent the activation of the motor before the lid 40 is secured to the container. In particular, as shown in FIGS. 2-3, the lid 40 has a lid body 46 and at least one tab 48 is attached to the lid body 46. As shown in FIG. 2, the tab 48 has an extended position in which the tab 48 prevents movement of the handle 42 into the second position. As shown in FIG. 3, the tab 48 has a retracted position in which the tab 48 permits movement of the handle 42 into the second position. As shown in FIGS. 2-3, the tab 48 may be movable from its extended position to its retracted position once the lid 40 is coupled to the container 20. In particular, the upper surface of the container 20 may push the tab 48 into a receptacle in the lid body 46 such that the tab 48 does not prevent movement of the handle into the second position once the lid 40 is coupled to the container 20. In one embodiment, there are first and second tabs 48, where the second tab 48 is positioned on a side of the lid body 46 opposite the first tab 48. In such an embodiment, the lid 40 must be aligned with multiple sides of the container 20 in order for both tabs 48 to retract. This prevents the handle 42 from being moved to the second position (and thus in a position to permit activation of the motor with the lid actuator 140) before the lid is in contact with multiple sides of the container.

The lid 40 may include a release button 70 configured to unlock the lid 40 from the container 20. In one embodiment, once the handle 42 is in the second position and the lid 40 is locked to the container 20, the handle 42 is locked in the second position until the release button 70 is pressed.

As illustrated, the lid body 46 may include one or more tabs 72 which are engageable with the handle when the handle is in the second position to prevent movement of the handle. In one embodiment, the handle 42 has openings (not shown) configured to receive the tabs 72. Pressing the release button 70 may retract the tabs causing the handle 42 to unlock from and move out from the second position. As the handle 42 is moved back to the first position, the container disengages from the lid such that the lid is unlocked from the container. In one embodiment, the tabs 72 are biased in a retracted position, and may, for example, be spring biased. In one embodiment, spring biased tabs 74 may also be provided on the underside of the handle 42. When the handle 42 is in the second position, the tabs 74 may retract into the handle 42, and when the release button 70 is pressed, the tabs 74 may press against the portion 38 of the lid 40 causing the handle 42 to pop up and out of the second position.

As mentioned above, aspects of the present invention are directed to a food processor including a container that is slidably and/or rotatably coupled to the base. Applicant recognized that this may provide a more secure connection between the container and the base in comparison to a container that is simply placed on top of a base. In particular, if a container is simply placed on top of a base, there is only downward movement of the container as it is placed onto the base. In contrast, in one embodiment, the container is slidably and/or rotatably coupled to the base such that there is sliding and/or rotational movement of the container relative to the base in a direction other than the direction of downward movement of the container towards the base. In one embodiment, the sliding and/or rotational movement of the container relative to the base is in a direction that is substantially perpendicular to the downward movement of the container onto the base. In one embodiment, the food processor includes a container that can be locked to the base.

As set forth below, in one embodiment, the container may be rotated relative to the base to lock the container to the base. FIGS. 7 and 8 illustrate one embodiment where the container 20 and the base 60 are configured to be rotatably coupled to each other. In particular, the top of the base 60 has spaced apart engagement elements 68 that are design to engage with spaced apart engagement elements 28 on the bottom of the container 20. In one illustrative embodiment, an engagement element 28 on the container 20 has a rib 30 with a stop 32 that limits the rotational movement of the container 20 on the base 60. As shown in FIG. 8, an engagement element 68 on the base 60 may include a slot configured to slidably receive the rib 30. In the illustrative embodiment, the container 20 and base 60 each includes four engagement elements 28, 68. It should be appreciated that a different number of engagement elements may also be provided as the invention is not so limited.

In one embodiment, clockwise rotation of the container relative to the base causes the rib 30 on the container 20 to engage with the slot on the base 60, and counterclockwise rotation of the container relative to the base causes the rib to disengage from the slot. It should be appreciated that in another embodiment, the container 40 may be coupled to the base 60 differently, as the invention is not so limited. For example, although a rotational coupling of the container to the base is discussed above, non-rotational sliding movement of the container relative to the base is also contemplated to slidably couple the container to the base. One of skill in the art would recognize that other engagement elements may be used to either rotatably couple the container to the base and/or non-rotatably couple the container to the base.

Applicant recognized that a user may want to secure the lid 40 to the container 20 and thereafter couple the container 20 to the base 60. However, in one embodiment where the container 20 has an actuator 100, once the lid 40 is coupled to the container 20, and the second end 104 of the actuator is in its second, extended position (see FIG. 11), such as when the handle 42 is moved to its second position, the position of the actuator 100 may interfere with the coupling of the container to the base 60.

Thus, in one embodiment, the base 60 is configured such that it can be coupled to the container 20 when the actuator 100 is in the second, extended position. As shown in FIGS. 8-9, in one embodiment, the base housing 62 has at least one receptacle 64 having a pathway configured to receive an actuator 100 to actuate a switch 158 (see FIG. 23) to permit activation of the motor 156. As illustrated, the receptacle includes an open side portion 82 such that the food processor container can be coupled to the base when the actuator is in the second, extended position. In one embodiment, the receptacle includes an open top portion 80. The receptacle 64 may include both an open top portion 60 and an open side portion 82 such that the container can be coupled to the container when the actuator 100 is in either the first or the second, extended position. In particular, the open side portion 82 of the receptacle 64 enables the extended end 104 of the actuator to enter the receptacle as the container 20 is slidably and/or rotatably coupled to the base 60.

As mentioned above, in one embodiment, the base 60 has a base actuator 160 positioned within the receptacle 64 and the second end 104 of the container actuator 100 is configured to contact the base actuator 160 when in the second, extended position. Movement of the base actuator 160 may activate the switch 158 to permit activation of the motor 156. As shown in FIG. 9, the base actuator 160 may have a ramped upper surface 162 which enables the end 104 of the container actuator 100 to actuate the base actuator 160 from either the open top portion 80 of the receptacle 64 or the open side portion 82 of the receptacle 64. If the actuator 100 is in its first position when the container is coupled to the base, the actuator 100 may enter the receptacle 64 from the open top portion 80 to actuate the base actuator 160. If the actuator 100 is in its second, extended position when the container is coupled to the base, the actuator 100 may enter the receptacle 64 from the open side portion 82 to actuate the base actuator 160.

As shown in FIG. 8, the base housing 62 may have a plurality of receptacles 64 configured to receive the container actuator 100. In this illustrative embodiment, first and second receptacles 64 are provided and each are configured such that the container 20 may be rotatably coupled to the base 60 when the actuator 100 is in the second, extended position. The first receptacle 64 is positioned for the container 20 to be coupled to the base 60 in a first orientation, and the second receptacle 64 is positioned for the container to be coupled to the base in a second orientation. For example, in FIG. 1, the container 20 is positioned in a first orientation such that the container handle 26 is positioned for use by a right-handed user. In contrast, the container may be positioned such that the container handle 26 is rotated approximately 90° to a second orientation for use by a left-handed user.

As shown in FIG. 8, the base 60 may include a weep notch 154 to facilitate cleaning and/or to permit drainage of any material that is spilled on or near the motor clutch 152.

Figure 12:
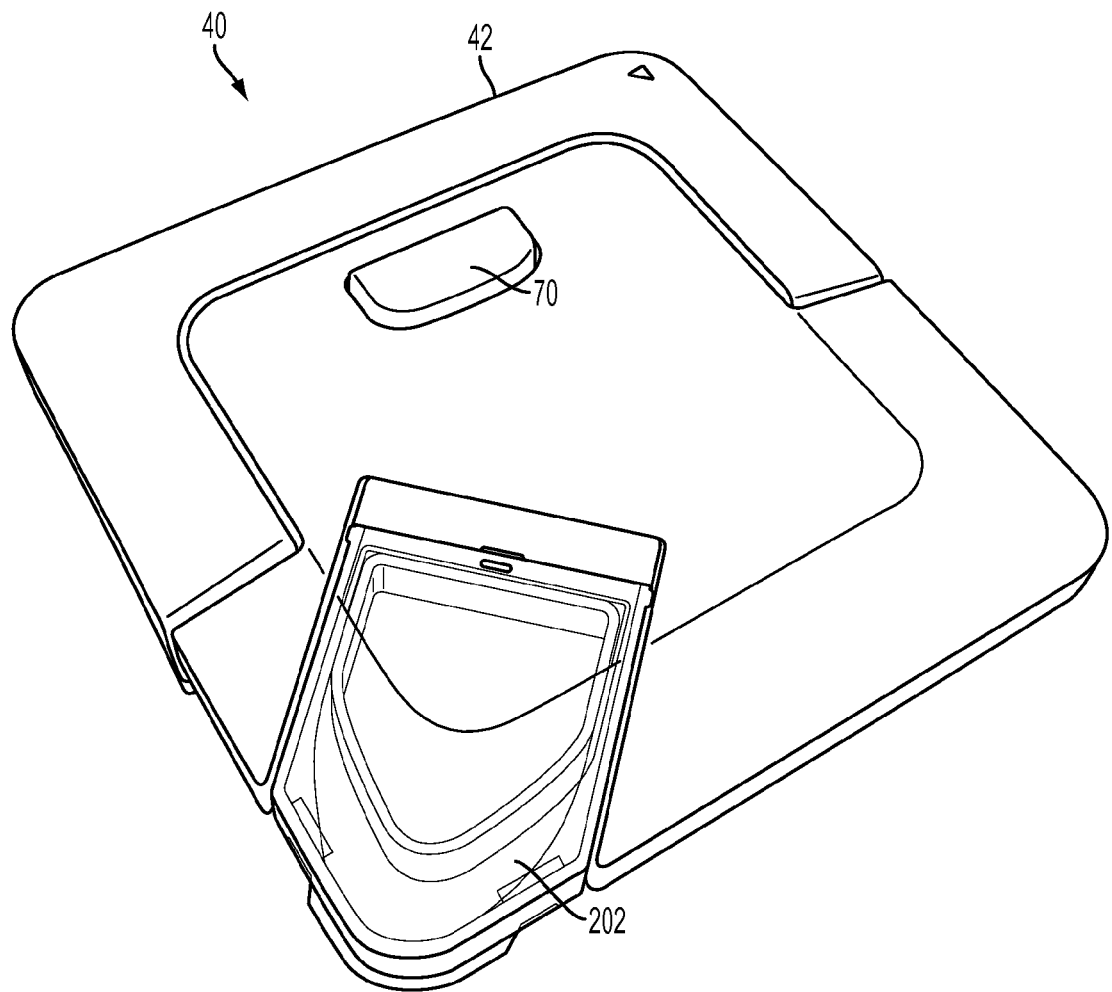
FIG. 12 is a perspective view of a lid according to one embodiment with a pour spout shown in a closed position.
Figure 13:
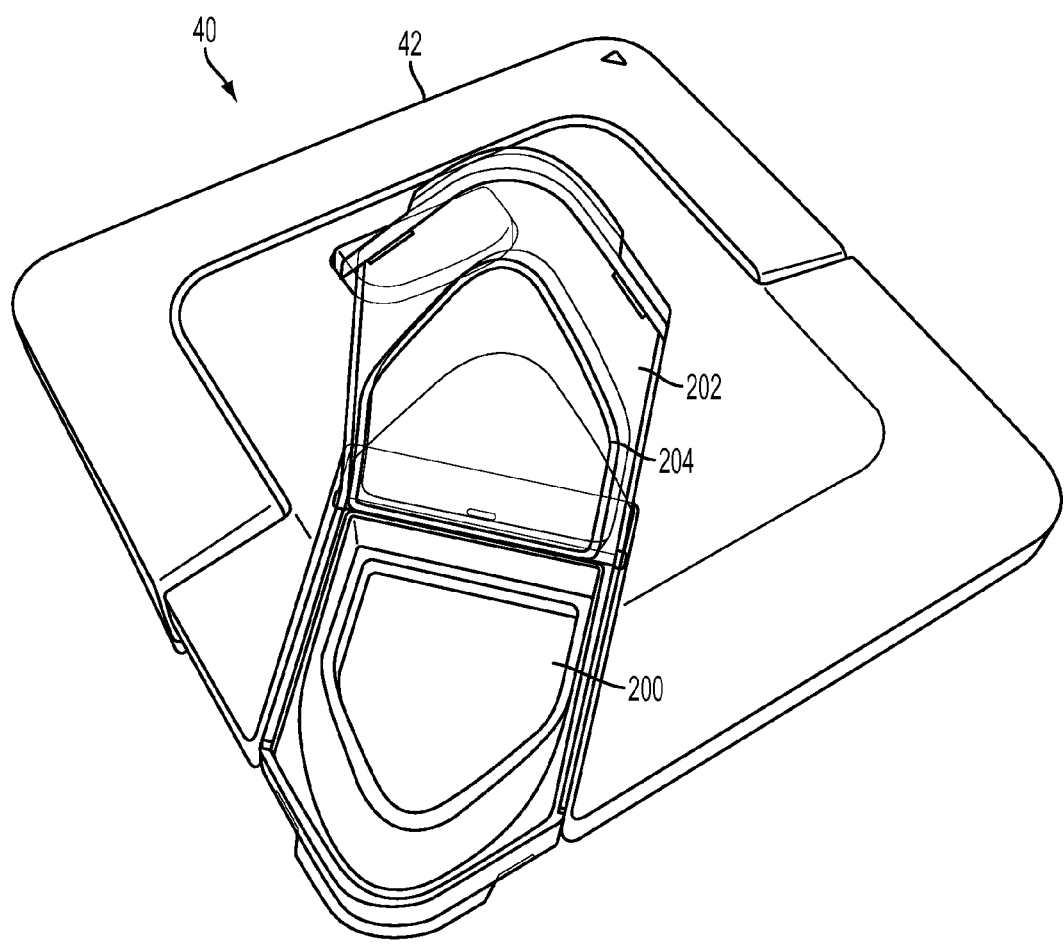
FIG. 13 is a perspective view of the lid shown in FIG. 12 with the pour spout shown in an open position.
Figure 14:
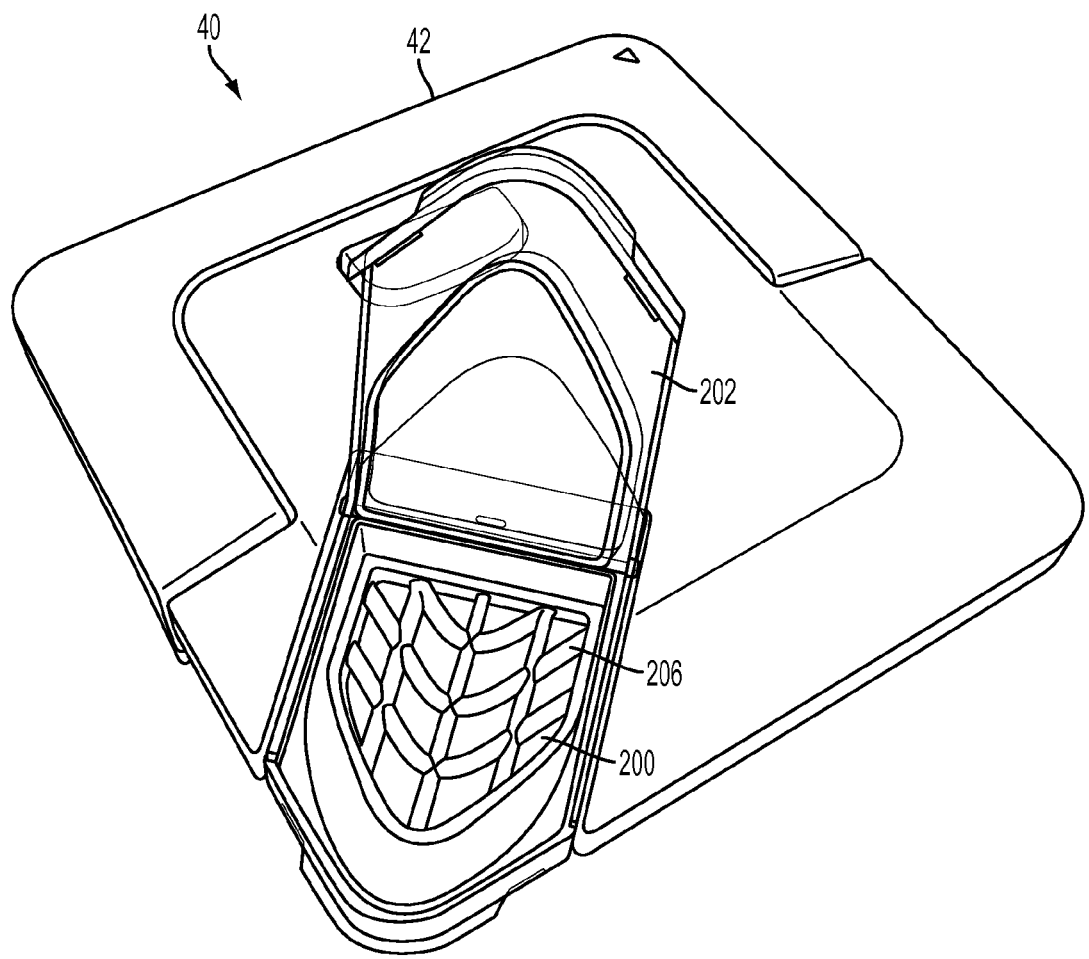
FIG. 14 is a perspective view of a lid according to another embodiment with the pour spout shown in an open position.

Turning now to FIGS. 12-14, the lid 40 will be discussed in greater detail. As shown, the lid 40 has an opening or pour spout 200 which may be configured for pouring contents of the container 20 out of the container when the lid 40 is secured to the container. The pour spout 200 may be positioned in a corner of the lid. The lid 40 may be locked to the container 20 such that the container can be tipped to pour contents from the container and the lid 40 remains locked to the container. As shown in FIG. 2, the lid 40 may include one or more seals or gaskets 204 extending around the lower perimeter of the lid 40 to prevent leakage between the lid 40 and the container 20. It is also contemplated that the pour spout opening 200 is sized such that contents may be poured into the container 20 through the opening 200.

A cover 202 may be configured to close the pour spout opening 200. In one illustrative embodiment, the cover 202 is pivotally attached to the lid 40. The cover 202 may include an inner lip 204 which mates with the perimeter of the opening 200 to prevent leakage from the opening 200 when the cover 202 is closed. The cover 202 may be translucent. It should be appreciated that in another embodiment, the cover may attach to the lid 40 by other conventional methods known to one of skill in the art and the cover may also be opaque as the invention is not so limited.

As shown in FIG. 14, the pour spout opening 200 has a finger guard 206 configured to prevent a user from inserting his/her fingers into the opening 200. The finger guard enables the contents of the container 20 to be poured from the opening 200 while preventing fingers, or other objects, from passing through the opening 200 and into the container 20. In this particular embodiment, the finger guard 206 is substantially grid-shaped. In other embodiments, the finger guard 206 may be shaped differently.

Figure 15:
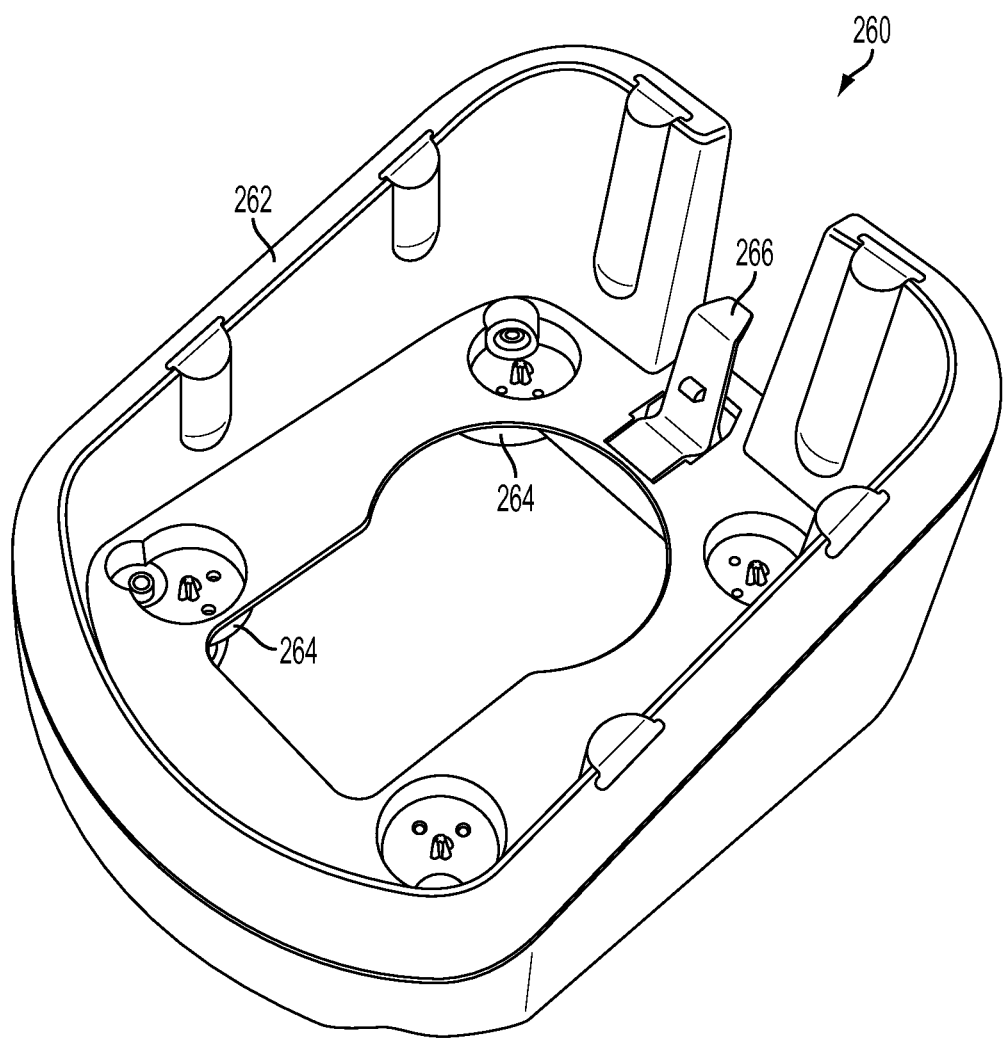
FIG. 15 is a top perspective view of a lower base assembly according to one embodiment.
Figure 16:
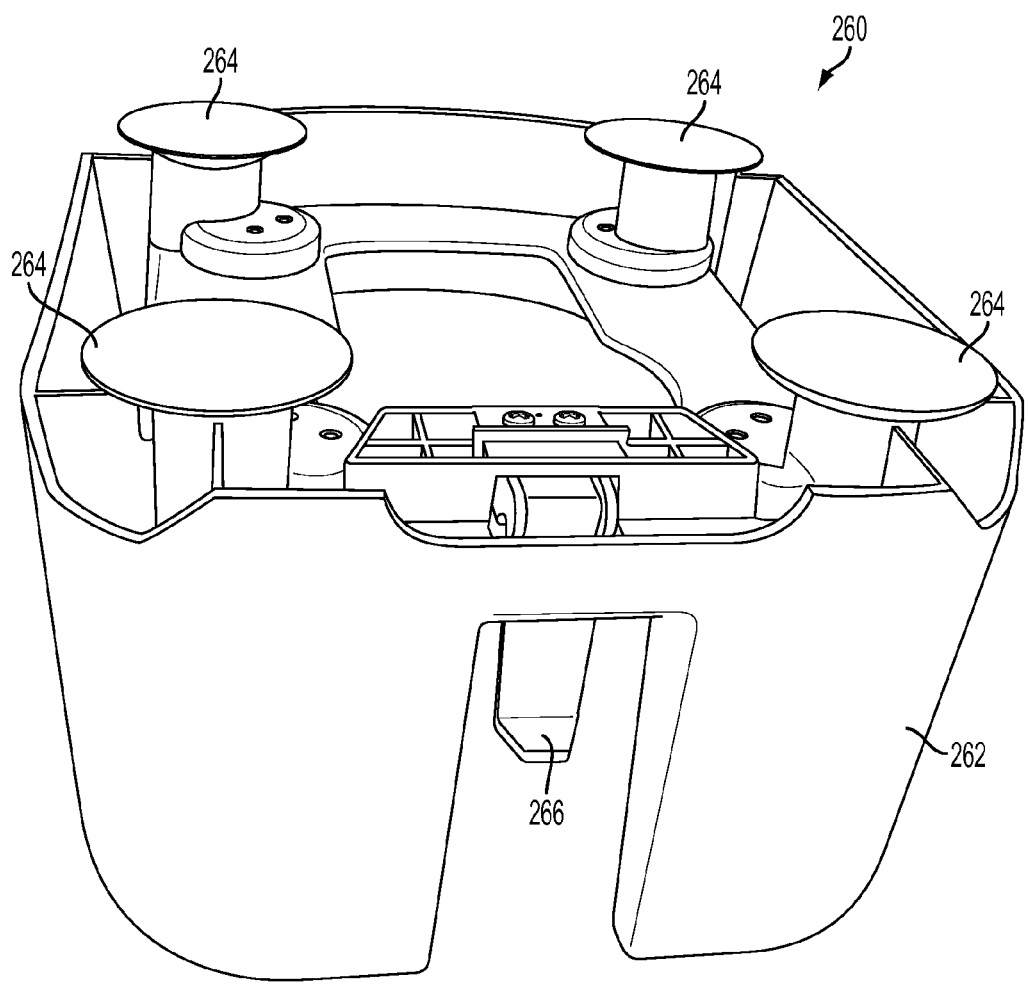
FIG. 16 is a bottom perspective view of the lower base assembly shown in FIG. 15.

FIGS. 15-16 illustrate a lower base assembly 260. The base assembly 260 has a body 262 with a plurality of suction cups 264 configured to adhere to a working surface, such as a countertop. The body 262 of the base assembly 260 may be configured to receive the base 60 of the food processor to prevent movement of the food processor 10 on a countertop or other working surface. In one illustrative embodiment, the lower base assembly 260 has a latch 266 configured to release the base 60 from the lower base assembly 260. It should be appreciated that in another embodiment, suction cups 262 may be secured directly to the base 60, as the invention is not so limited.

Figure 17:
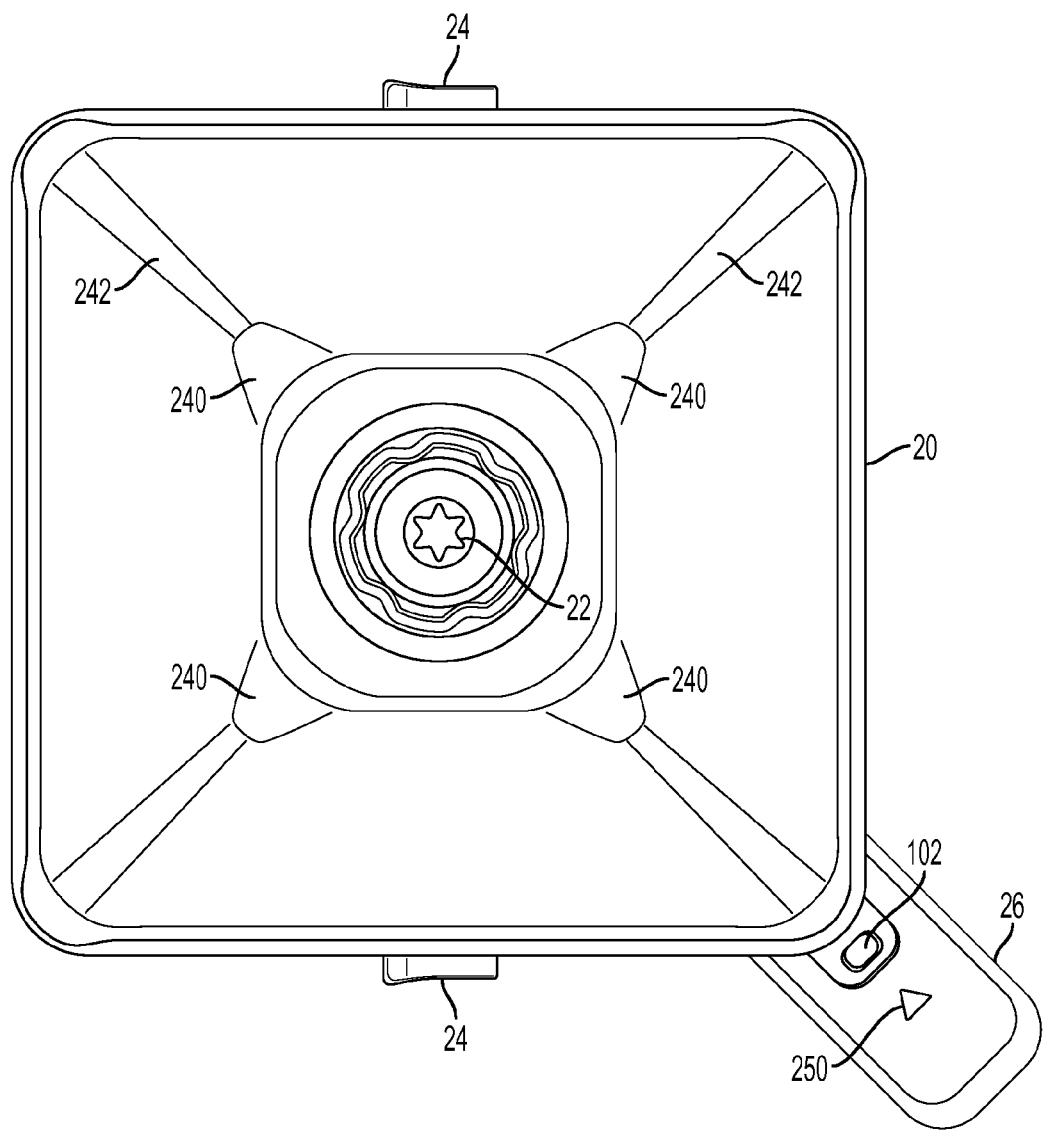
FIG. 17 is a top view of the container according to one embodiment.

FIG. 17 illustrates one embodiment of the container 20 in greater detail. As shown in this top view, the container 20 may have a substantially rectangular shape. As shown in FIGS. 1 and 17, in one embodiment, each inner corner 242 of the container 20 may be beveled. For example, each inner corner 242 may include a beveled surface 240. In one embodiment, the beveled surfaces are rounded and concave. In another embodiment, the beveled surfaces 240 are substantially planar. The beveled surfaces 240 may enhance the performance characteristics of the food processor 10. For example, the beveled surfaces 240 may assist in even blending and/or mixing of material within the food processor by preventing material within the container 20 from building up in the inner corners 242 of the container. As shown, the beveled surfaces 240 may be in each corner 240 of the container 20 and may extend along a lower portion of the container. In another embodiment, a beveled surface 240 may extend along a majority of the height of a corner 242, or may extend up to the top of the container 20.

As mentioned above, the container 20 may have a substantially rectangular shape, and the lid 40 may also have a substantially rectangular shape to correspond to the shape of the container. In one embodiment, the container is sized to hold up to approximately 72 ounces of fluid. In another embodiment, the container is sized to hold up to approximately 40 ounces of fluid, though any suitable volume capacity may be provided in various embodiments. It is also contemplated that in another embodiment, the container 20 and/or the lid 40 may be shaped differently, and may for example have a circular shape, as the invention is not so limited.

As shown in FIGS. 1-4 and 17, the container 20 and the lid 40 may have indicators 250, 252 to assist the user in positioning the lid 40 on the container 40. As mentioned above, the lid 40 may be configured to be positioned on the container such that the lid actuator 140 is aligned with the top end 102 of the container actuator 100. An indicator 250 may be positioned on the container handle 28, and an indicator 252 may be positioned on the lid 40 such that when the two indicators are aligned, the lid 40 is properly positioned on the container 20. In one illustrative embodiment, the indicators 250, 252 are arrow-like symbols, but it should be appreciated that in another embodiment, the indicators 250, 252 may be lines, words, and/or other symbols as the invention is not so limited.

As discussed above, the lid may be configured to lock with the container. The indicators 250, 252 may be configured to position the handle engagement element 44 with the container engagement element 24 so that the lid 40 may be locked to the container 20.

As mentioned above, the container 20 is configured to receive a blade assembly that is configured to mix, cut, puree, slice, dice, blend, whip or otherwise process food within the container, as the invention is not limited in this respect. It is contemplated that the food processor 10 may be used to process ingredients, such as, but not limited to, various liquids such as water, juice and alcohol, and various solids, such as fruits, vegetables and ice.

Figure 5:
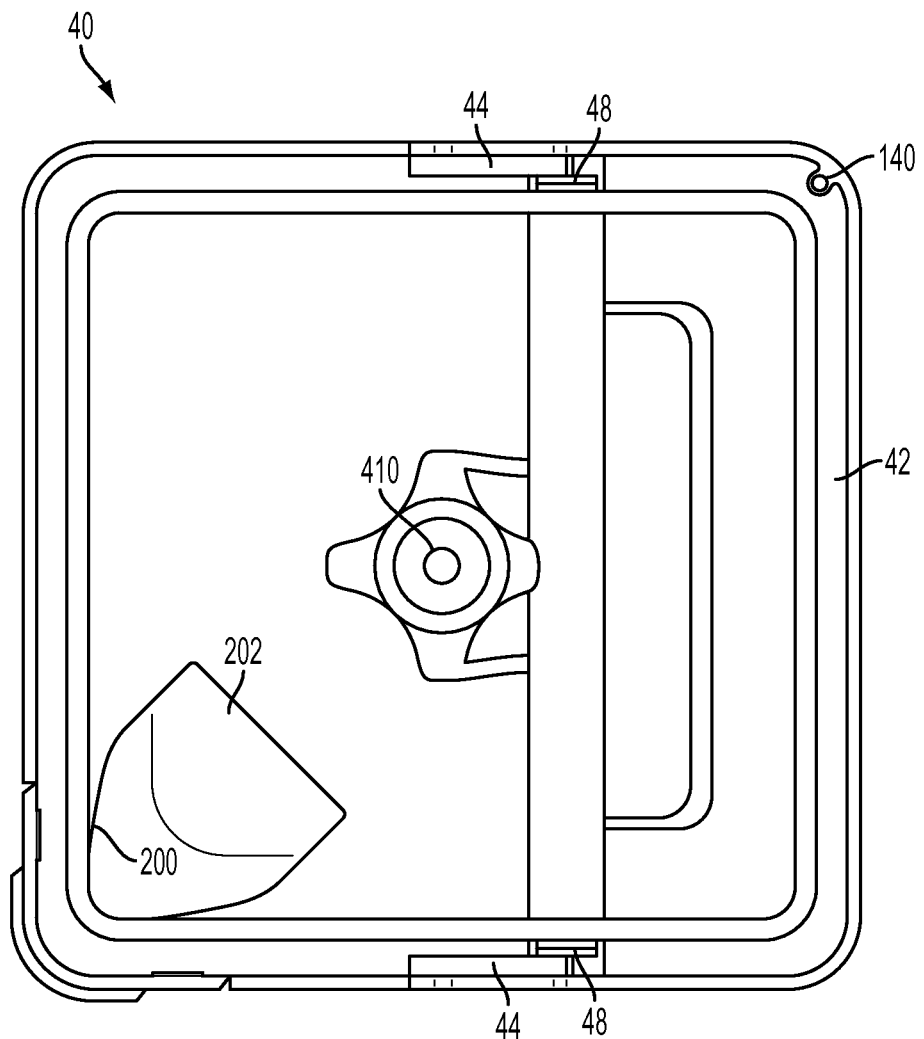
FIG. 5 is a bottom view of a lid according to one embodiment.

As shown in FIGS. 1 and 17, the container 20 may have an engagement element, such as spindle 22, configured to engage with a portion of the blade assembly. As shown in FIG. 5, the lid 40 may have an engagement element, such as bushing 410, configured to engage with a portion of the blade assembly. As set forth below, in one embodiment, the blade assembly is configured to engage with both the container 20 and the lid 40, and may have, for example, a first end configured to engage with the lid, and a second end configured to engage with the container. In other embodiments, the blade assembly may be configured to engage with only the lid 40 or the container 20, as the invention is not so limited.

Figure 18:
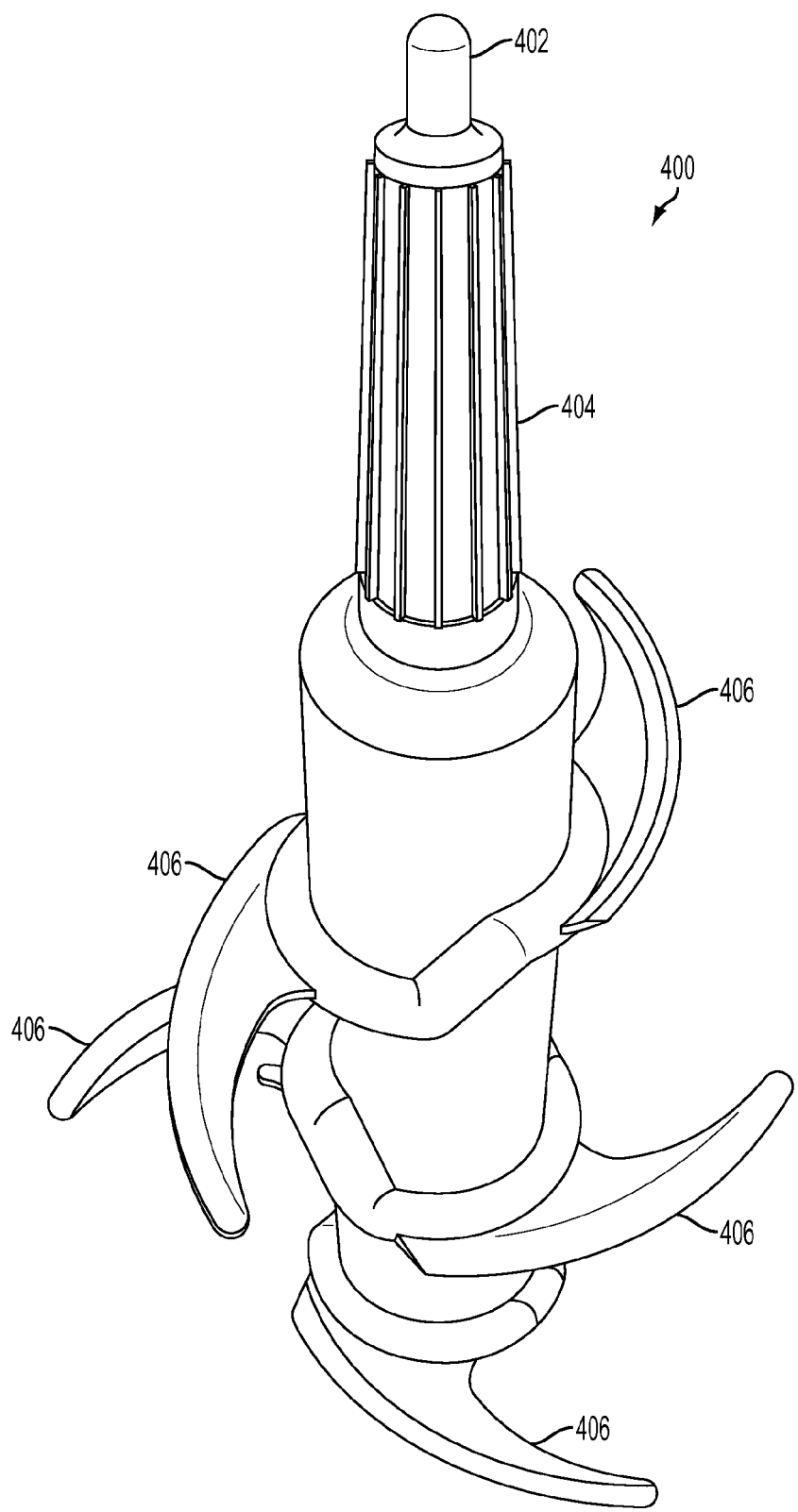
FIG. 18 is a perspective view of a blade assembly according to one embodiment.
Figure 19:
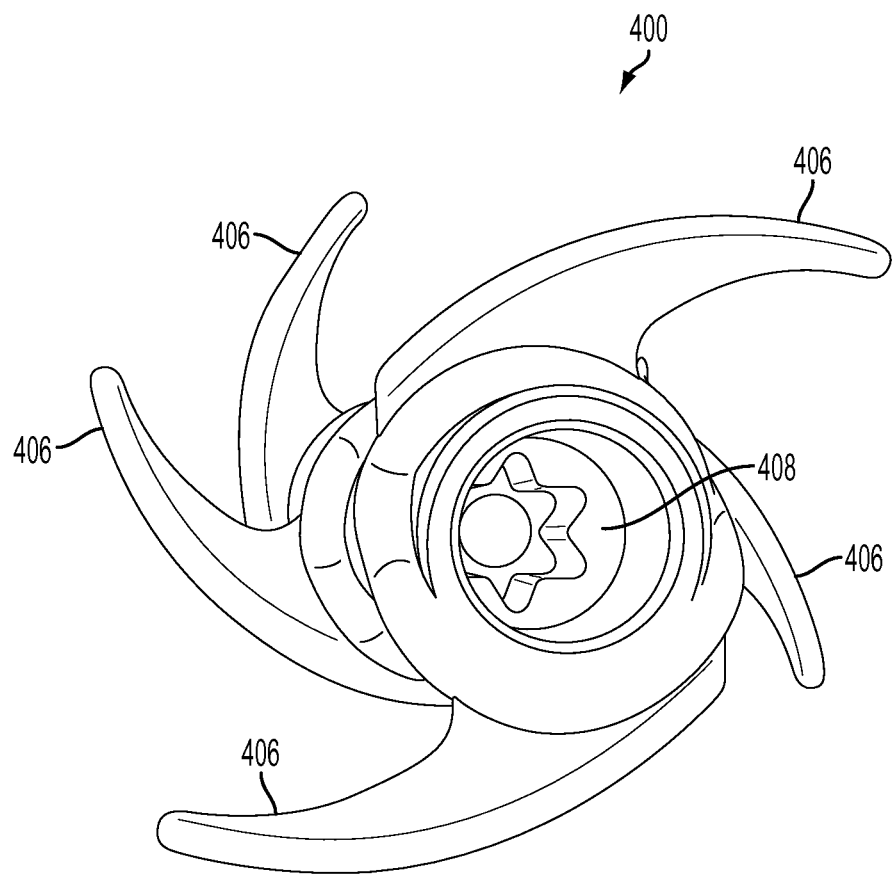
FIG. 19 is a bottom perspective view of the blade assembly shown in FIG. 18.

FIGS. 18 and 19 illustrate one embodiment of a blade assembly 400. As shown, the blade assembly 400 has a shaft 404 and a plurality of blades 406, and the blades 406 are arranged in pairs that are spaced apart along the length of the shaft 404. In one illustrative embodiment, the blade assembly includes three pairs of blades 406, but it should be recognized that in another embodiment, the blade assembly may include a different number of pairs of blades, for example one pair, two pairs or four or more pairs. The blades 406 may be removably coupled to the shaft 404. In another embodiment, the blades 406 are fixed to the shaft 404.

A first end 402 of the blade assembly 400 is configured to engage with the lid. More specifically, as shown, the first end 402 of the blade assembly may include a pin configured to be inserted into a bushing 410 located on the underside of the lid 40. As shown in FIG. 19, a second end 408 of the blade assembly may be configured to engage with the container 40. In this particular embodiment, the second end 408 of the blade assembly includes a cavity that is configured to engage with the spindle 22 on the container. As shown, the second end 408 of the blade assembly 400 may include a pattern, such as a star-shaped pattern which engages with the shape of the spindle 22. Although a star-shaped pattern is illustrated, one of skill in the art would appreciate that other configurations, such as, but not limited to, circular, triangular, square, rectangular, or hexagonal patterns, are also contemplated.

Figure 20:
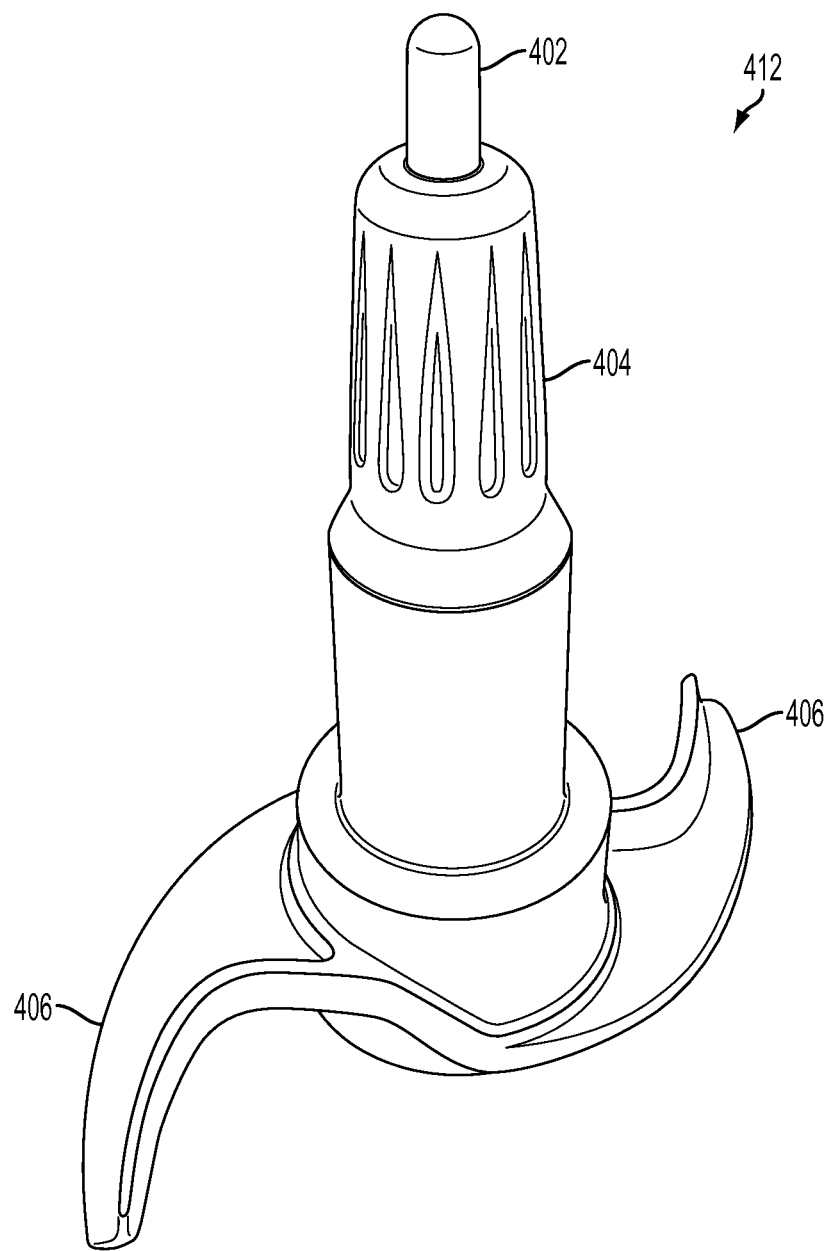
FIG. 20 is a perspective view of a blade assembly according to another embodiment.

FIG. 20 illustrates another embodiment of a blade assembly 412 that is similar to the embodiment disclosed in FIGS. 18-19, except that it only includes one pair of blades 406. As shown, this embodiment of the blade assembly 412 also includes a first end 402 configured to engage with the lid 40. It is also contemplated that the second end 408 (not shown) is configured to engage with the container 20.

The above blade assemblies 400, 412 include components that engage with the lid 40 and/or the container 40 to secure the blade assembly within the container for processing food. In the embodiments illustrated in FIGS. 18-20, a first end 402 of the blade assembly 400, 412 has a male component that is engageable with a female component on the lid 40, and the second end 408 of the blade assembly 400, 412 has a female component that is engageable with a male component on the container 40. It should be appreciated that the invention is not limited in this respect, and for example, in another embodiment, the first end 402 of the blade assembly 400, 412 may include a female component engageable with a male component on the lid, and/or the second end 408 of the blade assembly 400, 412 may include a male component that is engageable with a female component on the container 20. One of ordinary skill in the art would appreciate that a variety of other types of engagement elements may be used to couple the blade assembly 400, 412 to the container 20 and/or the lid 40.

It should be recognized that the blade assemblies 400, 412 shown in FIGS. 18-20 may be used for various applications, such as, but not limited to cutting, slicing, dicing, and pureeing food within the container. In one embodiment, the blades 406 have sharp edges to facilitate these applications. The blade assembly 412 shown in FIG. 20 may, for example, be constructed and arranged for kneading dough, and/or for finely chopping small items such as garlic and cloves.

Figure 21:
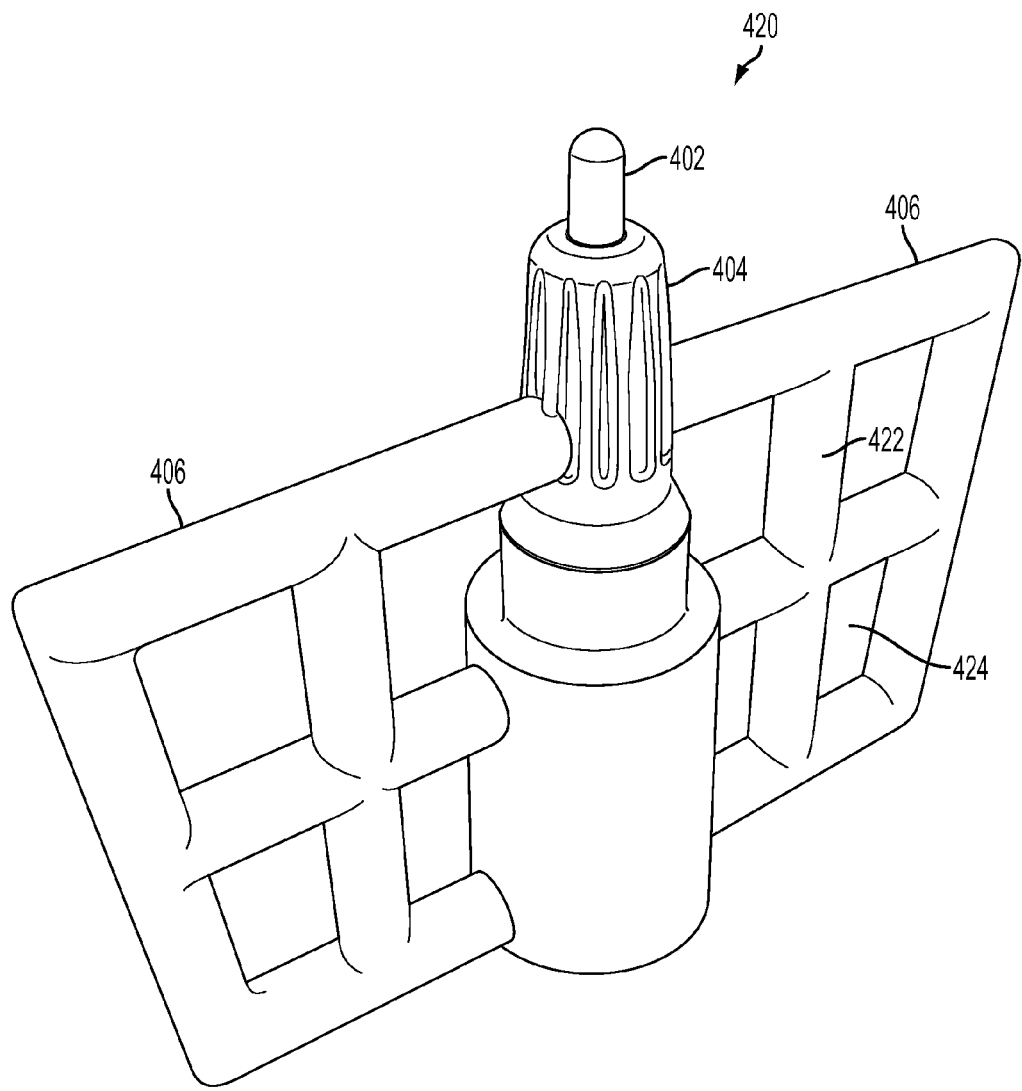
FIG. 21 is a perspective view of a blade assembly according to yet another embodiment.

FIG. 21 illustrates another embodiment of a blade assembly 420. In this particular embodiment, the blade assembly 420 includes a plurality of blades 406 that form a paddle-like configuration. Such a configuration may be used for mixing. As shown, the blade assembly 420 may also include a shaft 404 with a first end 402 configured to engage with the lid 40 and a second end (not shown) configured to engage with the container 20.

The paddle-like configuration of the blades 406 may together have a substantially rectangular shape. The blades 406 may be formed with a plurality of substantially linear segments 422 spaced apart by a plurality of openings 424 to form a grid-like pattern. It is contemplated that the openings 424 permit aeration of the components within the food processor 10. In one embodiment, the plurality of blades 406 are substantially parallel with each other such that it forms a substantially planar arrangement. The blade assembly 420 shown in FIG. 21 may be used for mixing food such as dough (e.g., cookie dough).

Figure 22:
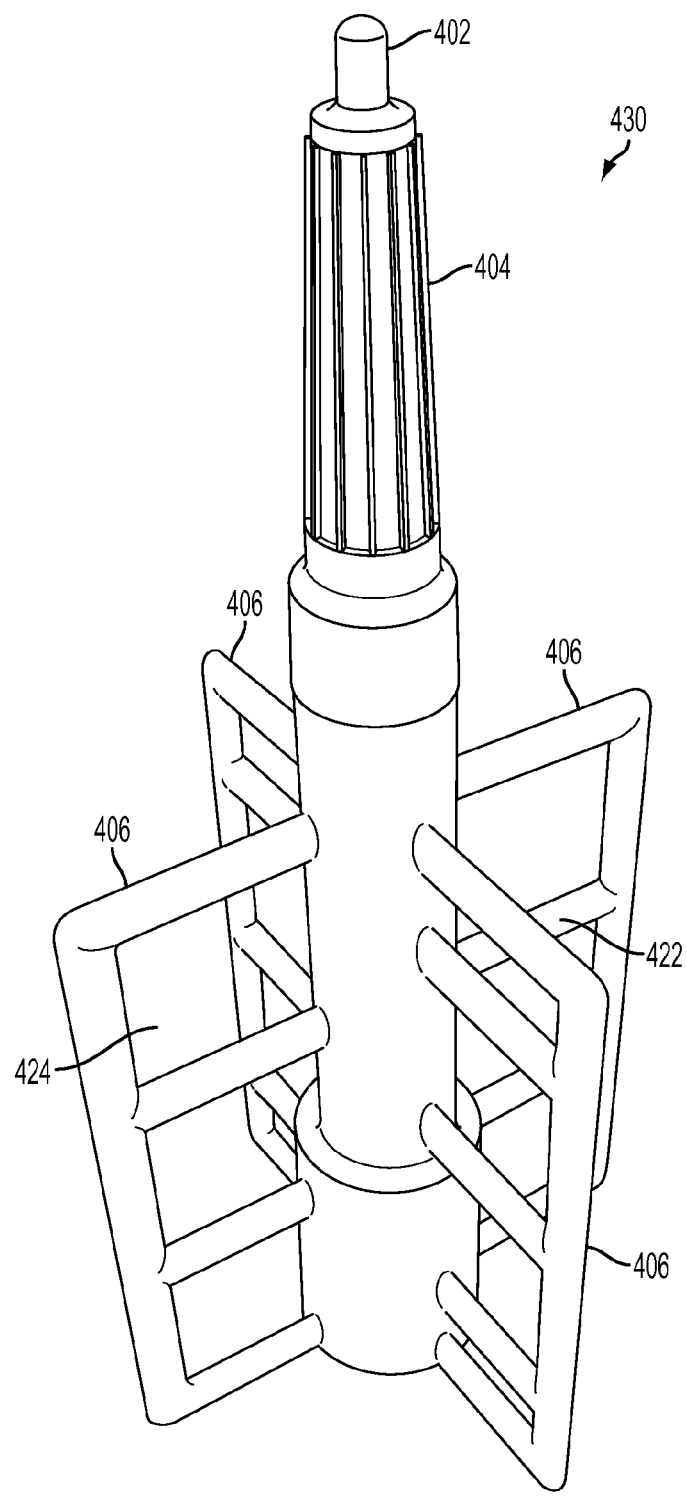
FIG. 22 is a perspective view of a blade assembly according to yet another embodiment.
Figure 23:
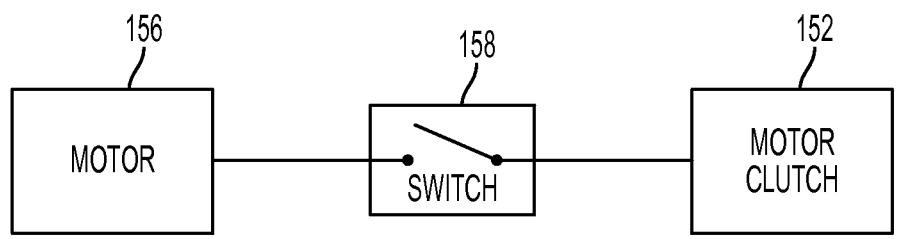
FIG. 23 is a block diagram illustrating a motor and a switch according to one embodiment.

FIG. 22 illustrates another embodiment of a blade assembly 430 which includes a plurality of blades 406. As shown, the blade assembly 430 may also include a shaft 404 with a first end 402 configured to engage with the lid 40 a second end (not shown) configured to engage with the container 20. As illustrated, the blades 406 may be formed with a plurality of substantially linear segments 422 spaced apart by a plurality of openings 424 to form a grid-like pattern. The blades 406 may be spaced apart by approximately 90°. It is also contemplated that the blades 406 may be spaced apart differently, such as, but not limited to 45°, 120°, or 180°. The blade assembly 430 shown in FIG. 22 may be used for whisking and/or whipping materials within the container.

In one embodiment, the blade assemblies 420, 430 are designed for various non-cutting applications, such as mixing. However, it is also contemplated that the blade assemblies 420, 430 may include one or more sharp edges designed for cutting as the invention is not so limited.

Regardless of the type of blade assembly used, the food processor 10 is configured such that the blade assembly rotates when the motor 156 is activated. As shown in FIG. 1, the base 60 may include a control panel 440 with a plurality of buttons configured to activate the motor. One of skill in the art would recognize that the control panel 440 may include a plurality of settings so that the user can regulate the speed of the motor. For example, in one embodiment, the control panel 440 may include a first setting which is a low speed which may be preferable for mixing dough. The control panel 440 may include a second setting which is a medium setting which may be preferable for general blending, and the control panel may include a third setting which is a high setting which may be preferable for crushing ice.

Applicant recognized that when processing certain ingredients, a conventional food processor may not be capable of maintaining a constant motor speed. For example, when processing a mixture, it may be desirable to process food with the blade assembly at a particular speed, such as, but not limited to 100 rpm, 200 rpm, or 500 rpm. However, a mixture, such as a dense mixture, may increase the load on the motor, which may cause the motor speed to undesirably change. Thus, in one embodiment, the motor 156 is configured to maintain a substantially constant rotational speed, regardless of the type of material being processed.

Figure 24:
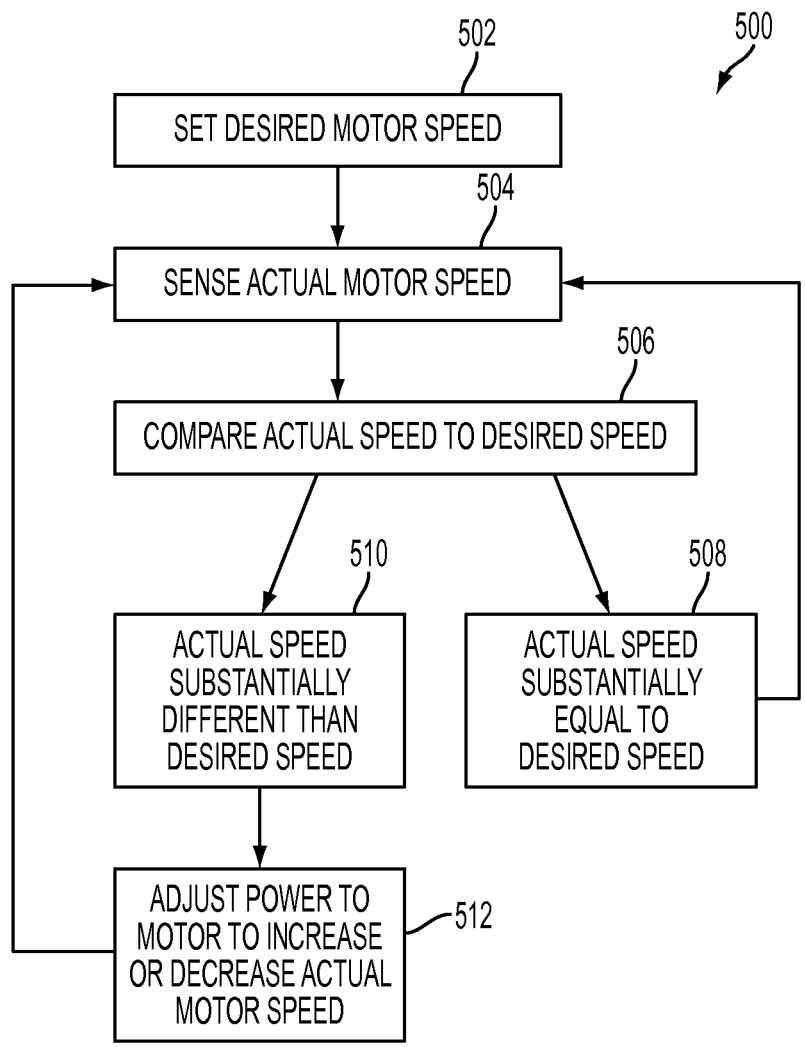
FIG. 24 schematically illustrates a current feedback system according to one embodiment.

In one embodiment, the motor 156 includes an electronic current feedback system 500 to maintain the rotational speed of the motor regardless of the load on the motor. As shown in the schematic diagram illustrated in FIG. 24, the current feedback system 500 may perform a series of acts including the act 502 of setting the desired motor speed, the act 504 of sensing the actual motor speed, and the act 504 of comparing the actual sensed motor speed to the desired motor speed. As shown in act 510 and 512, if the sensed motor speed is substantially different than the desired motor speed, the electronic current feedback system is configured to adjust the power to the motor to increase or decrease the motor speed accordingly. For example, if the actual motor speed is less that the desired speed, the current feedback system 500 may be configured to increase the power to the motor to increase the motor speed. As shown in act 508, if the actual speed is substantially equal to the desired speed, the system may go back to the act 504 of sensing the actual motor speed. The feedback system may be configured to continuously sense the motor speed, or intermittently sense the motor speed, for example, every 5 seconds.

The food processor may be formed from a variety of materials as the invention is not so limited. It is contemplated that the various components forming the lid 40, container 40 and base 60 may be formed of plastic and/or metal. It should be appreciated that the container 20 may be substantially transparent so that a user can view the contents thereof.

The present invention contemplates a variety of methods for using the above described food processor. For example, a method of processing foods in accordance with the present invention includes one or more of the acts of: providing a food processor which has a container, a blade assembly, a lid, a base with a motor configured to drive the blade assembly, and an actuator included with the container that is moveable between a first position and a second, extended position, wherein when the food processor container is coupled to the base and the actuator is in the second, extended position, the actuator is configured to actuate a switch to permit activation of the motor, coupling the lid to a top of the container, moving the container actuator into the second, extended position, and coupling the container to the base, where the base is constructed and arranged such that the container can be coupled to the base when the actuator is in the second, extended position.

A method of processing foods in accordance with the present invention includes one or more of the acts of: providing a food processor having a container, a blade assembly, a lid, and a base with a motor configured to drive the blade assembly, the lid having a handle movable between at least a first position and a second position, coupling the lid to a top of the container with the handle in the first position, and moving the handle from the first position to the second position to permit activation of the motor.

A method of processing foods in accordance with the present invention includes one or more of the acts of: providing a food processor having a container, a blade assembly, and a lid, the lid having a handle movable between at least a first position and a second position, coupling the lid to a top of the container with the handle in the first position, and moving the handle from the first position to the second position to lock the lid to the container.

It should be appreciated that various embodiments of the present invention may be formed with one or more of the above-described features. The above aspects and features of the invention may be employed in any suitable combination as the present invention is not limited in this respect. It should also be appreciated that the drawings illustrate various components and features which may be incorporated into various embodiments of the present invention. For simplification, some of the drawings may illustrate more than one optional feature or component. However, the present invention is not limited to the specific embodiments disclosed in the drawings. It should be recognized that the present invention encompasses embodiments which may include only a portion of the components illustrated in any one drawing figure, and/or may also encompass embodiments combining components illustrated in multiple different drawing figures.

It should be understood that the foregoing description of various embodiments of the invention are intended merely to be illustrative thereof and that other embodiments, modifications, and equivalents of the invention are within the scope of the invention recited in the claims appended hereto.

The invention claimed is:

1. A food processor comprising:
 a container sized for receiving food to be processed;
 a blade assembly;
 a base constructed and arranged such that the container is coupleable to the base, the base comprising:
  a housing;
  a motor within the housing, the motor configured to drive the blade assembly;
 an actuator included with the container, the actuator being moveable between a first position and a second, extended position, wherein when the container is coupled to the base and the actuator is in the second, extended position, the actuator is configured to actuate a switch to permit activation of the motor; and
 wherein the base is constructed and arranged such that the container is coupleable to the base with the actuator in the second, extended position.

2. The food processor of claim 1, wherein the base is constructed and arranged such that the container can be rotatably coupled to the base with the actuator in the second, extended position.

3. The food processor of claim 1, wherein the container has an open top, the food processor further comprising a lid configured to cover the top of the container.

4. The food processor of claim 3, wherein the lid has a handle movable between a first position and a second position, and the lid further has a lid actuator, wherein when the lid is coupled to the container, movement of the handle into the second position moves the lid actuator into contact with the container actuator to permit activation of the motor.

5. The food processor of claim 1, wherein the base housing includes at least one receptacle configured to receive the container actuator for permitting activation of the motor, wherein at least a side portion of the at least one receptacle is open such that the container can be coupled with the base.

6. The food processor of claim 5, wherein a top portion of the at least one receptacle is open such that the container can be coupled with the base.

7. The food processor of claim 5, further comprising a base actuator positioned within the at least one receptacle, wherein the container actuator is configured to contact the base actuator when in the second, extended position to permit activation of the motor.

8. The food processor of claim 7, wherein the base actuator has a ramped upper surface.

9. The food processor of claim 5, wherein the at least one receptacle includes a first receptacle and a second receptacle, each configured to selectively receive the container actuator such that the container may be rotatably coupled to the base in a first orientation with the container actuator in the first receptacle and in a second orientation with the container actuator in the second receptacle.

10. The food processor of claim 7, wherein the base actuator is spring biased in a direction toward the container.

11. The food processor of claim 1, wherein the container actuator is spring biased in the first position.

12. A method of processing foods using,
 a food processor having a container, a blade assembly, a lid, a base with a motor configured to drive the blade assembly, and an actuator included with the container that is moveable between a first position and a second, extended position, wherein when the food processor container is coupled to the base and the actuator is in the second, extended position, the actuator is configured to actuate a switch to permit activation of the motor, the method comprising:
 coupling the lid to a top of the container;
 moving the container actuator into the second, extended position; and with the actuator in the second, extended position, coupling the container to the base.

13. The method of claim 12, wherein coupling the container to the base includes rotatably coupling the container to the base.

14. The method of claim 12, wherein coupling the container to the base locks the container to the base.

15. The method of claim 12, further comprising coupling the blade assembly to the inside of the container.

16. The method of claim 15, further comprising activating the motor to drive the blade assembly.

17. The method of claim 12, wherein the lid has a handle moveable between a first handle position and a second handle position, and the lid further has a lid actuator, and wherein moving the container actuator into the second, extended position comprises moving the handle into the second handle position to move the lid actuator into contact with the container actuator.

18. The method of claim 12, wherein the base includes at least one receptacle configured to receive the container actuator for permitting activation of the motor, wherein at least a side portion of the receptacle is open such that the container cart be coupled with the base.

19. The method of claim 18, wherein a top portion of the at least one receptacle is open.

20. The method of claim 18, wherein a base actuator is positioned within the at least one receptacle, and further comprising contacting the base actuator with the container actuator with the container actuator in the second, extended position to permit activation of the motor.

21. The method of claim 20, wherein the base actuator has a ramped upper surface.

22. The method of claim 18, wherein at least one receptacle includes a first receptacle and a second receptacle, and further comprising:
rotatably coupling the container to the base in a first orientation such that the container actuator is received in the first receptacle;
removing the container from the base; and
rotatably coupling the container to the base in a second orientation such that the container actuator is received in the second receptacle.

23. The method of claim 20, wherein the base actuator is spring biased in a direction toward the container.

24. The food processor of claim 12, wherein the container actuator is spring biased toward the first position.

* * * * *